(12) United States Patent
Aoki et al.

(10) Patent No.: US 10,017,168 B2
(45) Date of Patent: Jul. 10, 2018

(54) BRAKE SYSTEM

(71) Applicant: NISSIN KOGYO CO., LTD., Ueda, Nagano (JP)

(72) Inventors: Yasushi Aoki, Nagano (JP); Hiroaki Tokoi, Nagano (JP); Nobuyuki Kobayashi, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 189 days.

(21) Appl. No.: 15/040,511

(22) Filed: Feb. 10, 2016

(65) Prior Publication Data

US 2016/0236664 A1   Aug. 18, 2016

(30) Foreign Application Priority Data

Feb. 13, 2015   (JP) .................................. 2015-026985
Feb. 13, 2015   (JP) .................................. 2015-026986
(Continued)

(51) Int. Cl.
*B60T 13/68* (2006.01)
*B60T 8/40* (2006.01)
(Continued)

(52) U.S. Cl.
CPC ............ *B60T 13/686* (2013.01); *B60T 8/171* (2013.01); *B60T 8/176* (2013.01); *B60T 8/4081* (2013.01);
(Continued)

(58) Field of Classification Search
CPC .... B60T 13/142; B60T 13/686; B60T 8/4081; B60T 8/171; B60T 8/176; B60T 11/28
See application file for complete search history.

(56) References Cited

U.S. PATENT DOCUMENTS 4,711,266 A   12/1987 Leiber
4,730,877 A   3/1988 Seibert et al.
(Continued)

FOREIGN PATENT DOCUMENTS

DE   3502018 A1   7/1986
EP   0265623 A2   5/1988
(Continued)

OTHER PUBLICATIONS

Extended European Search Report in related EP Application No. 16155232.8 dated May 20, 2016, 9 pages.
(Continued)

*Primary Examiner* — Xuan Lan Nguyen
(74) *Attorney, Agent, or Firm* — Andrew M. Calderon; Roberts Mlotkowski Safran Cole & Calderon, P.C.

(57) ABSTRACT

In one embodiment of the brake system, the connection of the master cylinder and the slave cylinder to the wheel brakes can be switched by the first switching valve and the second switching valve, and the communication with the slave cylinder can be cut off by the first cutoff valve and the second cutoff valve. This enables the fluid pressures which are applied to the wheel brakes to be put in the various states without having a complex configuration, thereby making it possible to control the fluid pressures with good efficiency in such a way as to match suitably the conditions of the brake system and the conditions of the vehicle.

20 Claims, 9 Drawing Sheets

(30) Foreign Application Priority Data

Feb. 13, 2015 (JP) .................................. 2015-026987
Feb. 13, 2015 (JP) .................................. 2015-026988

(51) Int. Cl.
*B60T 13/14* (2006.01)
*B60T 8/171* (2006.01)
*B60T 8/176* (2006.01)
*B60T 11/28* (2006.01)
*B60T 8/36* (2006.01)

(52) U.S. Cl.
CPC ............. *B60T 11/28* (2013.01); *B60T 13/142* (2013.01); *B60T 8/3635* (2013.01)

(56) References Cited

U.S. PATENT DOCUMENTS

| | | | |
|---|---|---|---|
| 4,989,925 A | 2/1991 | Kohno | |
| 8,851,579 B2 * | 10/2014 | Ohkubo | B60T 7/042 303/113.2 |
| 2003/0020327 A1 | 1/2003 | Isono et al. | |
| 2003/0038541 A1 | 2/2003 | Suzuki et al. | |
| 2003/0201669 A1 | 10/2003 | Yokoyama et al. | |
| 2007/0132310 A1 | 6/2007 | Yamamoto | |
| 2008/0036293 A1 | 2/2008 | Yamamoto | |
| 2008/0210499 A1 | 9/2008 | Isono et al. | |
| 2011/0042171 A1 | 2/2011 | Knechtges | |
| 2012/0169112 A1 | 7/2012 | Jungbecker et al. | |
| 2013/0080016 A1 | 3/2013 | Bohn et al. | |
| 2013/0173130 A1 | 7/2013 | Vollert et al. | |
| 2013/0207452 A1 | 8/2013 | Gilles et al. | |
| 2013/0270895 A1 | 10/2013 | Nishioka et al. | |
| 2014/0008965 A1 * | 1/2014 | Ito | B60T 8/4081 303/3 |
| 2015/0025767 A1 | 1/2015 | Feigel | |
| 2015/0091370 A1 | 4/2015 | Yamasaki et al. | |
| 2015/0166030 A1 * | 6/2015 | Kobayashi | B60T 13/58 303/14 |
| 2016/0159332 A1 | 6/2016 | Yang | |
| 2016/0207514 A1 | 7/2016 | Knechtges et al. | |
| 2016/0221554 A1 | 8/2016 | Knechtges et al. | |

FOREIGN PATENT DOCUMENTS

| | | |
|---|---|---|
| JP | 2003034244 | 2/2003 |
| JP | 2008296751 | 12/2008 |
| JP | 2012-106637 | 6/2012 |
| WO | 2011116998 A1 | 9/2011 |

OTHER PUBLICATIONS

Extended European Search Report in related EP Application No. 16155231.0-1756 dated May 20, 2016, 8 pages.
Response to European Search Report in related EP Application No. 16155231.0-1756 dated Feb. 17, 2017, 18 pages.
Response to European Search Report in related EP Application No. 16155232.8-1756 dated Feb. 17, 2017, 21 pages.
European Office Action dated Dec. 6, 2017 for EP Patent Application No. 16155231.0, 5 pages.
European Office Action dated Dec. 6, 2017 for EP Patent Application No. 16155232.8, 10 pages.
Final Office Action in related U.S. Appl. No. 15/040,474 dated Jun. 2, 2017, 13 pages.
Office Action dated Nov. 2, 2017 for U.S. Appl. No. 15/040,474, 10 pages.
Japanese Office Action dated Jul. 25, 2017 for Japanese Patent Application 2015-026987; 11 pages.
Japanese Office Action dated Jul. 25, 2017 for Japanese Patent Application 2015-026988; 9 pages.
Japanese Office Action dated Aug. 1, 2017 for Japanese Patent Application 2015-026985; 9 pages.
Final Office Action dated Feb. 23, 2018 for U.S. Appl. No. 15/040,474, 10 pages.

* cited by examiner

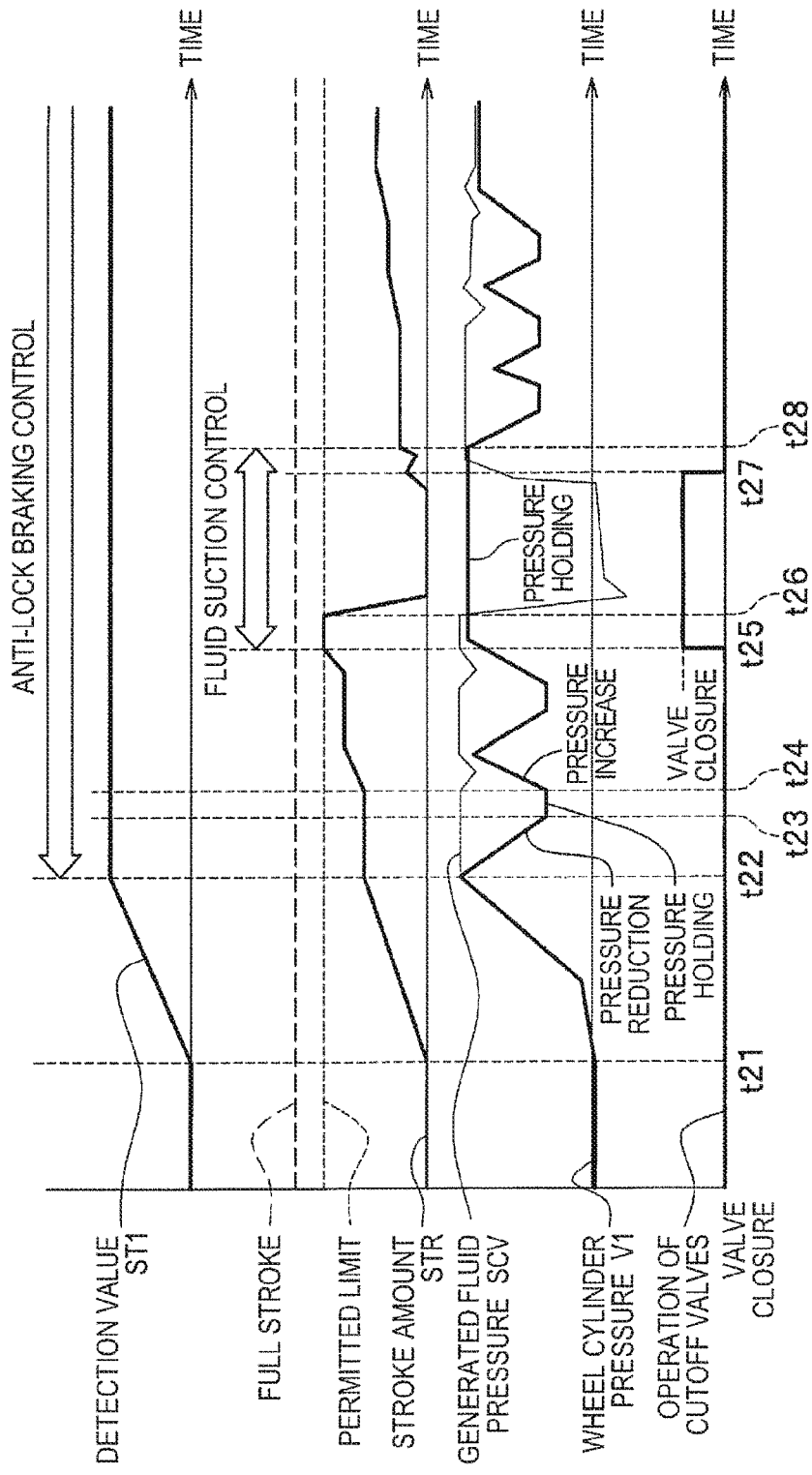

BRAKE SYSTEM

CROSS-REFERENCE TO RELATED APPLICATION(S)

This application claims priorities from Japanese Patent Applications No. 2015-026985 filed on Feb. 13, 2015, No. 2015-026986 filed on Feb. 13, 2015, No. 2015-026987 filed on Feb. 13, 2015, and No. 2015-026988 filed on Feb. 13, 2015, the entire contents of which are incorporated herein by reference.

FIELD

The present invention relates to a brake system which is employed for a vehicle.

BACKGROUND

Conventionally, as a brake system for generating a fluid pressure corresponding to a traveling amount of a brake operator, there is known a brake-by-wire type brake system like one described in JP-A-2012-106637.

This brake system has an input unit, a slave cylinder and a fluid pressure control unit. The input unit includes a master cylinder which generates a fluid pressure by means of a piston which is connected to a brake operator and a stroke simulator which gives a pseudo operation reaction force to the brake operator. The slave cylinder includes an electric motor as an electric actuator and a piston which is driven by this electric motor.

In this brake system, the electric motor of the slave cylinder is driven based on a traveling amount of the brake operator, and a fluid pressure is applied to each of wheel brakes by the piston which is driven by the electric motor. In addition, when an anti-lock braking is executed, the fluid pressure control unit is activated to operate to control the fluid pressure applied to the specific wheel brake or brakes. JP-A-2012-106637

The brake system described in JP-A-2012-106637 includes many constituent units, resulting in a problem that the brake system is enlarged in size and becomes complex in architecture.

In the brake system described in JP-A-2012-106637, the tandem type cylinder having two pistons is used for the master cylinder and the slave cylinder, causing a problem that the input unit and the slave cylinder unit are enlarged in size.

In order to avoid the enlargement in size of both the units, for example, in the event that a single type cylinder having a single piston is used for the slave cylinder, in case an abnormal situation where the brake fluid pressure is reduced occurs in one brake system of the two brake systems, there may be fears that the effect of the reduced brake fluid pressure is imposed on the other brake system. This causes a problem that it is difficult to secure the fluid pressure raising performance of the other brake system.

In the brake system described in JP-A-2012-106637, the hydraulic systems are pressurized by driving the slave cylinder, and therefore, the hydraulic systems can be pressurized to reach the high fluid pressure area by increasing the stroke amount of the slave cylinder piston provided in the slave cylinder. Namely, the brake system is obtained which has the fluid pressure raising function which can cope with the required fluid pressure required by the driver by increasing the stroke amount of the slave cylinder piston. However, increasing the stroke of the piston expands the axial length of the cylinder, which enlarges the size of the slave cylinder, calling for an enlargement in size of the brake system.

In the brake system described in JP-A-2012-106637, the hydraulic systems are pressurized by driving the slave cylinder, and therefore, the hydraulic systems can preferably be pressurized to reach the high fluid pressure area by increasing the stroke amount of the slave cylinder piston provided in the slave cylinder. Namely, the brake system is obtained which has the fluid pressure raising function which can cope with the required fluid pressure required by the driver by increasing the stroke amount of the slave cylinder piston. However, increasing the stroke amount of the slave cylinder piston expands the axial length of the cylinder, which enlarges the size of the slave cylinder, calling for an enlargement in size of the brake system. In addition, during an anti-lock braking control, a pressure increasing control to increase a fluid pressure applied to the wheel brakes, a pressure holding control to hold the fluid pressure or a pressure reducing control to reduce the fluid pressure is executed frequently, and therefore, there are possibility that the slave cylinder is enlarged in size so as to secure the brake fluid to be supplied to the wheel brakes.

SUMMARY

A problem that the invention is to solve is how to provide a brake system which can suppress the enlargement in size and complexity in architecture thereof.

A brake system of the invention which is devised to solve the problem described above includes a first brake system which communicates with at least one wheel brake of a plurality of wheel brakes and a second brake system which communicates with the remaining wheel brakes. The brake system includes a master cylinder for generating a fluid pressure to be applied the wheel brakes through operation of a brake operator by a driver and a slave cylinder for generating a fluid pressure by employing an electric actuator which is driven based on a traveling amount of the brake operator. The brake system includes a first hydraulic fluid line which is provided on the first brake system and which establishes a communication from the master cylinder to the wheel brake, a second hydraulic fluid line which is provided on the second brake system and which establishes a communication from the master cylinder to the wheel brakes, a first communication line which establishes a communication from the slave cylinder to the first hydraulic fluid line and a second communication line which establishes a communication from the slave cylinder to the second hydraulic fluid line. The brake system includes a first switching valve which is provided in a communicating position between the first hydraulic fluid line and the first communication line to switch between a state where a fluid pressure in the master cylinder is given to the wheel brake through the first hydraulic fluid line and a state where a fluid pressure in the slave cylinder is given to the wheel brake through the first communication line and the first hydraulic fluid line and a second switching valve which is provided in a communicating position between the second hydraulic fluid line and the second communication line to switch between a state where a fluid pressure in the master cylinder is given the wheel brakes through the second hydraulic fluid line and a state where a fluid pressure in the slave cylinder is given to the wheel brakes through the second communication line and the second hydraulic fluid line. Further, the brake system includes a first cutoff valve which is provided on the first communication line to cut off the first communication line, a second cutoff valve which is provided on the second communication line to cut off the second communication line and control valve modules which are provided individually downstream of the first switching valve in the first hydraulic fluid line and downstream of the second switching valve in the second hydraulic fluid line to control a fluid pressure to be applied to each wheel brake.

In the brake system described above, the connection of the master cylinder and the slave cylinder to the wheel brakes can be switched by the first switching valve and the second switching valve, and the communication with the slave cylinder can be cut off by the first cutoff valve and the second cutoff valve. This enables the fluid pressures which are applied to the wheel brakes to be put in the various states without having a complex configuration, thereby making it possible to control the fluid pressures with good efficiency in such a way as to match suitably the conditions of the brake system and the conditions of the vehicle.

Then, the fluid pressures can be controlled with good efficiency without having a complex configuration, and therefore, it is possible to restrict the brake system from being enlarged in size.

Additionally, the fluid pressures in the brake systems can be increased separately, and the fluid pressures applied to the brake systems from the slave cylinder can be cut off separately, whereby the efficient fluid pressure control can be realized.

The first switching valve and the second switching valve may be a three-way valve which switch between a state where when not energized, the three-way valve establishes a communication between the master cylinder and the wheel brakes and cuts off a communication between the slave cylinder and the wheel brakes and a state where when energized, the three-way valve cuts off a communication between the master cylinder and the wheel brakes and establishes a communication between the slave cylinder and the wheel brakes. By adopting this configuration, the establishing and cutting off of the communications can be switched by the single valve, and this simplifies the configuration of the brake system, which contributes to the reduction in size of the brake system.

In the event that the slave cylinder includes one hydraulic fluid chamber, the hydraulic fluid chamber may communicate with the first communication line and the second communication line by way of a common hydraulic fluid line. By adopting this configuration, an efficient fluid pressure control can be executed by the single hydraulic fluid chamber. Additionally, the brake system can be restricted from being enlarged in size.

In case the brake system includes a pressure sensor for measuring a fluid pressure in the common on hydraulic fluid line, a fluid pressure in the slave cylinder can be detected by the single pressure sensor, and therefore, the configuration of the brake system can be simplified, and an efficient fluid pressure detection can be executed.

In case the brake system includes a reservoir tank for reserving brake fluid, a supply line for supplying the brake fluid from the reservoir tank to the slave cylinder and a check valve which is provided on the supply line and the check valve is configured to permit only a flow of brake fluid from the reservoir tank to the slave cylinder, the brake fluid in the reservoir tank can be supplied to the salve cylinder through the supply line when a pressurizing operation by the slave cylinder is released. Additionally, a transmission of a fluid pressure generated in the slave cylinder to the reservoir tank can preferably be prevented by the check valve.

The supply line may be connected to the first communication line, the second communication line or the common hydraulic fluid line. By adopting this configuration, the necessity of providing a supply port on the slave cylinder is obviated, and hence, the configuration of the brake system is simplified. In this case, a transmission of a fluid pressure generated in the slave cylinder to the reservoir tank can preferably be prevented by the check valve.

The brake system may include a return fluid line which establishes a communication from an outlet valve provided on each of the control valve modules to the reservoir tank. By adopting this configuration, when the fluid pressures at the wheel brakes are reduced, the brake fluid can be returned to the reservoir tank through the return fluid line without involving a reservoir for reserving the brake fluid temporarily. Consequently, a smooth passage of the brake fluid can be realized.

In case the reservoir tank includes a first supply port which supplies the brake fluid to the master cylinder and a second supply port which is independent of the first supply port, the return fluid line may be connected to the second supply port. By adopting this configuration, the brake fluid can be returned directly to the reservoir tank without having to be returned by way of other constituent elements. Consequently, a smoother passage of the brake fluid can be realized.

The first cutoff valve and the second cutoff valve are made up of a normally open solenoid valve, whereby the cutoff valves do not have to be energized when a normal braking is executed in which fluid pressures are generated at the wheel brakes by the slave cylinder. Consequently, it is possible to keep the consumed electric power to a lowest level.

Valve bodies of the first cutoff valve and the second cutoff valve may be pressed against valve seats from the slave cylinder side. By adopting this configuration, the cutoff valves can be closed smoothly without any resistance when the slave cylinder performs a pressurizing operation.

The master cylinder, the slave cylinder and the control valve modules maybe configured into an integral unit. By adopting this configuration, the master cylinder, the slave cylinder and the control valve modules can be mounted on the vehicle as the integral unit, and therefore, the brake system can be restricted from being enlarged in size and complex in architecture.

A problem to be solved by the invention is how to provide a brake system which can realize the reduction in size of the brake system and in which even in case abnormality occurs in one brake system of two brake systems, the fluid pressure raising performance of the other brake system can be secured.

A brake system of the invention which is devised to solve the problem includes a first brake system which communicates with at least one wheel brake of a plurality of wheel brakes and a second brake system which communicates with the remaining wheel brakes. The brake system includes a master cylinder for generating a fluid pressure which is applied to the wheel brakes through operation of a brake operator by the driver and a slave cylinder for generating a fluid pressure by an electric actuator which is driven based on a traveling amount of the brake operator. The master cylinder includes two pistons and is configured so as to output a fluid pressure generated in the master cylinder to each of the first brake system and the second brake system. The slave cylinder includes one hydraulic fluid chamber and is configured to output a fluid pressure generated in the slave cylinder to each of the first brake system and the second brake system. The brake system includes a first switching valve which is provided in the first brake system and which switches between a state where the fluid pressure of the master cylinder is given to the wheel brakes and a state where the fluid pressure of the slave cylinder is given to the wheel brakes. The brake system also includes a second switching valve which is provided in the second brake system and which switches a state where the fluid pressure of the master cylinder is given to the wheel brakes and a state where the fluid pressure of the slave cylinder is given to the wheel brakes. The brake system includes further a first communication line which originates from the slave cylinder to reach the first switching valve, a second communication line which originates from the slave cylinder to reach the second switching valve, a first cutoff valve which can out off the first communication line, and a second cutoff valve which can cut off the second communication line. The brake system includes a control unit for controlling the driving of the electric actuator and controlling the operation of the switching valves and the cutoff valves. In the event that abnormality in fluid pressure occurs in either the first brake system or the second brake system, the control unit closes the first cutoff valve or the second cutoff valve of the brake system where the abnormality in fluid pressure is occurring and opens the first cutoff valve or the second cutoff valve of the brake system where the fluid pressure is normal.

In the brake system described above, the slave cylinder including the single hydraulic fluid chamber is employed, and hence, the brake system can be made small in size. In addition, the control unit closes the cutoff valve in the brake system where the abnormality in fluid pressure is occurring and opens the cutoff valve in the brake system where the fluid pressure is normal. Consequently, even in the event of an abnormal situation where the brake fluid is reduced occurring in one of the two brake systems, the fluid pressure raising performance of the other brake system can preferably be secured by driving the slave cylinder.

In addition, the switching valves can switch between the state where the fluid pressure of the master cylinder is given to the wheel brakes and the state where the fluid pressure of the slave cylinder is given to the wheel brakes, and the communication lines from the slave cylinder to the switching valves can be cut off by the cutoff valves. Thus, the fluid pressure applied to the wheel brakes can be changed variously, thereby making it possible to realize the efficient fluid pressure control which can preferably cope with the conditions of the brake system and the conditions of the vehicle.

A determination unit may be provided which determines on an occurrence of abnormality in the first brake system and the second brake system based on a relationship between a fluid pressure which is raised by the slave cylinder and a stroke amount of the slave cylinder. In this case, the determination unit may determine that abnormality is occurring in the event that the fluid pressure which is raised by the slave cylinder is lower than a predetermined fluid pressure which corresponds to the stroke amount of the slave cylinder. By adopting this configuration, whether or not the abnomiality of reduction in brake fluid is occurring can preferably be determined by the determination unit.

Here, the "stroke amount of the slave cylinder" means a stroke amount of a slave cylinder piston which is provided in the slave cylinder.

The control unit may close the first cutoff valve and open the second cutoff valve in the event that abnormality of reduced brake fluid is determined by the determination unit to be occurring in the first brake system. Further, the control unit may close the second cutoff valve and open the first cutoff valve in the event that abnormality of reduced brake fluid is determined by the determination unit to be occurring in the second brake system. By adopting this configuration, in the event of the abnormality of reduced brake fluid occurring in the first brake system, the fluid pressure raising performance of the second brake system can preferably be secured. In addition, also in the vent of the abnormality of reduced brake fluid occurring in the second brake system, the fluid pressure raising performance of the first brake system can preferably be secured.

The slave cylinder may communicate with the first communication line and the second communication line by way of a common hydraulic fluid line which is connected to the hydraulic fluid chamber, a pressure sensor for measuring a fluid pressure in the common hydraulic fluid line may be provided, and the determination unit may make a determination based on a detection value of the pressure sensor. By adopting this configuration, with the single pressure sensor, it is possible to determine whether or not the fluid pressure raised by the slave cylinder is lower than the predetermined fluid pressure which corresponds to the stroke amount of the slave cylinder.

In addition, for example, the determination unit may make a determination based on a detection value of the pressure sensor obtained when the slave cylinder is driven with one of the first cutoff valve and the second cutoff valve closed and a detection value of the pressure sensor obtained when the slave cylinder is driven with the other of the first cutoff valve and the second cutoff valve closed. By adopting this configuration, the occurrence of abnormality in fluid pressure can be determined by closing the cutoff valves sequentially, and therefore, the occurrence of abnormality in fluid pressure in each of the brake systems can be detected efficiently by the single pressure sensor.

In addition, for example, the determination unit may make a determination based on a detection value of the pressure sensor obtained when the slave cylinder is driven with both the first cutoff valve and the second cutoff valve closed. By adopting this configuration, it is possible to detect efficiently whether or not abnormality is occurring in the slave cylinder.

In addition, for example, the determination unit may initially make a determination based on a detection value of the pressure sensor obtained when the slave cylinder is driven with both the first cutoff valve and the second cutoff valve closed and then make a determination based on a detection value of the pressure sensor obtained when the slave cylinder is driven with one of the first cutoff valve and the second cutoff valve closed and a detection value of the pressure sensor obtained when the slave cylinder is driven with the other of the first cutoff valve and the second cutoff valve closed. By adopting this configuration, the occurrence of abnormality in fluid pressure can be determined by closing the cutoff valves sequentially after whether or not abnormality is occurring in the slave cylinder is determined. Because of this, the occurrence of abnormality in the slave cylinder and the occurrence of abnormality in fluid pressure in each of the brake systems can be detected efficiently by the single pressure sensor.

Additionally, the determination unit may initially make a determination based on a detection value of the pressure sensor obtained when the slave cylinder is driven with one of the first cutoff valve and the second cutoff valve closed and a detection value of the pressure sensor obtained when the slave cylinder is driven with the other of the first cutoff valve and the second cutoff valve closed and then make a determination based on a detection value of the pressure sensor obtained when the slave cylinder is driven with both the first cutoff valve and the second cutoff valve closed. By adopting this configuration, whether or not abnormality is occurring in the slave cylinder can be determined after the occurrence of abnormality in fluid pressure is determined by closing the cutoff valves sequentially. Therefore, the occurrence of abnormality in fluid pressure in each of the brake systems and the occurrence of abnormality in the slave cylinder can be detected efficiently by the single pressure sensor.

Additionally, in the event that the determination unit determines that the detection value of the pressure sensor obtained when the slave cylinder is driven with both the first cutoff valve and the second cutoff valve closed does not correspond to the stroke amount of the slave cylinder, the control unit may switch the first switching valve and the second switching valve so that a communication is established between the master cylinder and the wheel brakes while the communication between the slave cylinder and the wheel brakes is cut off in the first brake system and the second brake system. By adopting this configuration, the fluid pressures at the wheel brakes can be raised by the fluid pressure from the master cylinder should abnormality occur.

The first cutoff valve and the second cutoff valve are a normally open solenoid valve, whereby the cutoff valves do not have to be energized at the time of the normal braking in which fluid pressures are generated at the wheel brakes by the slave cylinder. Consequently, the consumed electric power can be suppressed to the minimum level.

The valve bodies of the first cutoff valve and the second cutoff valve may be pressed against corresponding valve seats from a side facing the slave cylinder. By adopting this configuration, the cutoff valves can be closed smoothly without any resistance involved when the slave cylinder is activated to perform a pressurizing operation.

A problem to be solved by the invention is how to provide a brake system which can preferably raise a fluid pressure to a high fluid pressure area white avoiding a risk of a slave cylinder being enlarged in size.

A brake system of the invention which is devised to solve the problem described above includes a slave cylinder for generating a fluid pressure by an electric actuator which is driven based on a traveling amount of a brake operator. The brake system includes a fluid line which establishes a communication from the slave cylinder to wheel brakes, a cutoff valve which is provided on the fluid line and which can cut off the fluid line, a reservoir tank for reserving brake fluid, a supply line for supplying the brake fluid from the reservoir tank to the slave cylinder, and a control unit which executes a fluid suction control to suck in the brake fluid from the supply line. The control unit determines whether or not the fluid suction control needs to be executed, and in the event that the control unit determines that the fluid suction control needs to be executed, the control unit is configured to execute a control in which the cutoff valve is closed and the slave cylinder is driven in a depressurizing direction by the electric actuator.

In the brake system described above, in the event that the fluid suction control needs to be executed, the cutoff valve is closed, and the slave cylinder is driven in the depressurizing direction. As a result, a negative pressure is produced in the slave cylinder (in a hydraulic fluid chamber), whereby the brake fluid is sucked into the slave cylinder from the supply line. Consequently, even in the event that an axial length of the slave cylinder is designed relatively short, the brake fluid can be supplied into the slave cylinder for re-pressurization through the fluid suction control. This can provide the brake system which can preferably raise the fluid pressure to the high fluid pressure area while avoiding a risk of the slave cylinder being enlarged in size.

In addition, the control unit may execute the fluid suction control in the event that a stroke amount of the slave cylinder becomes equal to or greater than a predetermined amount. By adopting this configuration, the fluid suction control is executed only when a high fluid pressure is necessary, thereby making it possible to obtain the brake system which can preferably raise the fluid pressure to the high fluid pressure area while avoiding a risk of the slave cylinder being enlarged in size.

Additionally, the electric actuator may be an electric motor, and the stroke amount of the slave cylinder may be specified based on a rotation angle sensor for detecting a rotation angle of the electric motor. By adopting this configuration, the stroke amount can be specified accurately based on the rotation angle of the electric motor, and a timing at which the fluid suction control is executed can easily be specified.

The control unit may determine that the fluid suction control needs to be executed in the event that a rising amount of a required fluid pressure required by the driver becomes equal to or smaller than a predetermined amount. By adopting this configuration, the fluid suction control can be executed at a timing which does not affect the braking feeling.

The control unit may determine that the fluid suction control needs to be executed in the event that an absolute value of a required fluid pressure required by the driver becomes equal to or greater than a predetermined value. By adopting this configuration, the fluid pressure can be raised well in, for example, a brake assist control which involves a greater pressure rise than a rise made when the brakes are applied normally.

In addition, a check valve may be provided on the supply line, the check valve being configured to permit only a flow of the brake fluid from the reservoir tank to the slave cylinder. By adopting this configuration, the brake fluid in the reservoir tank can be supplied into the slave cylinder through the supply line when the pressurizing operation of the slave cylinder is released. Additionally, a fluid pressure generated in the slave cylinder can preferably be prevented from being transmitted to the reservoir tank by the check valve.

The cutoff valve is a normally open solenoid valve. By adopting this configuration, the cutoff valve does not have to be energized when the normal braking is executed in which the fluid pressure which is applied to the wheel brakes is generated by the slave cylinder. Consequently, the consumed electric power can be suppressed to the minimum level.

A problem to be solved by the invention is how to provide a brake system which can preferably raise a fluid pressure to a high fluid pressure area while avoiding a risk of a slave cylinder being enlarged in size and which can preferably secure brake fluid to be supplied to wheel brakes.

A brake system of the invention which is devised to solve the problem described above includes a slave cylinder for generating a fluid pressure by an electric actuator which is driven based on an operation of a brake operator. The brake system includes a fluid line which establishes a communication from the slave cylinder to wheel brakes, a cutoff valve which is provided on the fluid line and which can cut off the fluid line, a reservoir tank for reserving brake fluid, a supply line for supplying the brake fluid from the reservoir tank to the slave cylinder, and a control unit which executes a fluid suction control to suck in the brake fluid from the supply line. In the event that the amount of the brake fluid in the slave cylinder is reduced as a result of depressurizing the wheel brakes, the control unit is configured to execute a control as the fluid suction control in which the cutoff valve is closed and the slave cylinder is driven in a depressurizing direction by the electric actuator.

In the brake system described above, in the event that the amount of the brake fluid in the slave cylinder is reduced as a result of depressurizing the wheel brakes, the cutoff valve is closed, and the slave cylinder is driven in the depressurizing direction. As a result, a negative pressure is produced in the slave cylinder (in a hydraulic fluid chamber), whereby the brake fluid is sucked into the slave cylinder from the supply line. Consequently, even in the event that an axial length of the slave cylinder is designed relatively short, the brake fluid can be supplied into the slave cylinder for re-pressurization through the fluid suction control. This can provide the brake system which can preferably raise the fluid pressure to the high fluid pressure area while avoiding a risk of the slave cylinder being enlarged in size. Moreover, even in the event that the amount of the brake fluid in the slave cylinder is reduced as a result of a pressure increasing control to increase a fluid pressure to be applied to the wheel brakes during the anti-lock braking control, a pressure holding control to hold the fluid pressure or a pressure reducing control to reduce the fluid pressure being executed frequently, the brake fluid which is supplied to the wheel brakes can preferably be secured through the fluid suction control.

The fluid suction control which is executed in the event that the amount of the brake fluid in the slave cylinder is reduced includes not only a fluid suction control which is executed at a timing at which the amount of the brake fluid in the slave cylinder is reduced but also a fluid suction control which is executed at a predetermined timing which comes after the amount of the brake fluid in the slave cylinder is reduced.

The control unit may execute the fluid suction control in the event that wheels are controlled through a pressure holding control or a pressure reducing control. In this way, by executing the fluid suction control when the wheels are controlled through the other controls than the pressure increasing control, the brake fluid can be secured effectively during the anti-lock braking control.

The control unit may execute the fluid suction control in the event that a relationship between a fluid pressure which is raised by the slave cylinder and a stroke amount of the slave cylinder does not satisfy a predetermined relationship. By adopting this configuration, the brake fluid can be supplied into the slave cylinder through the fluid suction control, and the fluid pressure which is raised by the slave cylinder can be the predetermined fluid pressure which corresponds to the stroke amount of the slave cylinder.

The brake system may include a road surface friction coefficient estimation module for estimating a road surface friction coefficient during an anti-lock braking control, and the control unit may change a timing at which the fluid suction control is executed based on a road surface friction coefficient which is estimated by the road surface friction coefficient estimation module. By adopting this configuration, the brake fluid can be secured effectively, for example, in the event that the anti-lock braking control (the pressure reducing control, the pressure holding control) continues for a relatively long length of time on a low-road surface whose road surface friction coefficient is low.

BRIEF DESCRIPTION OF DRAWINGS

FIG. 10 is a timing chart showing timings at which the fluid suction control is executed when an anti-lock braking control is executed.

DETAILED DESCRIPTION

Hereinafter, referring to the accompanying drawings, an embodiment for carrying out the invention will be described in detail.

Figure 1:
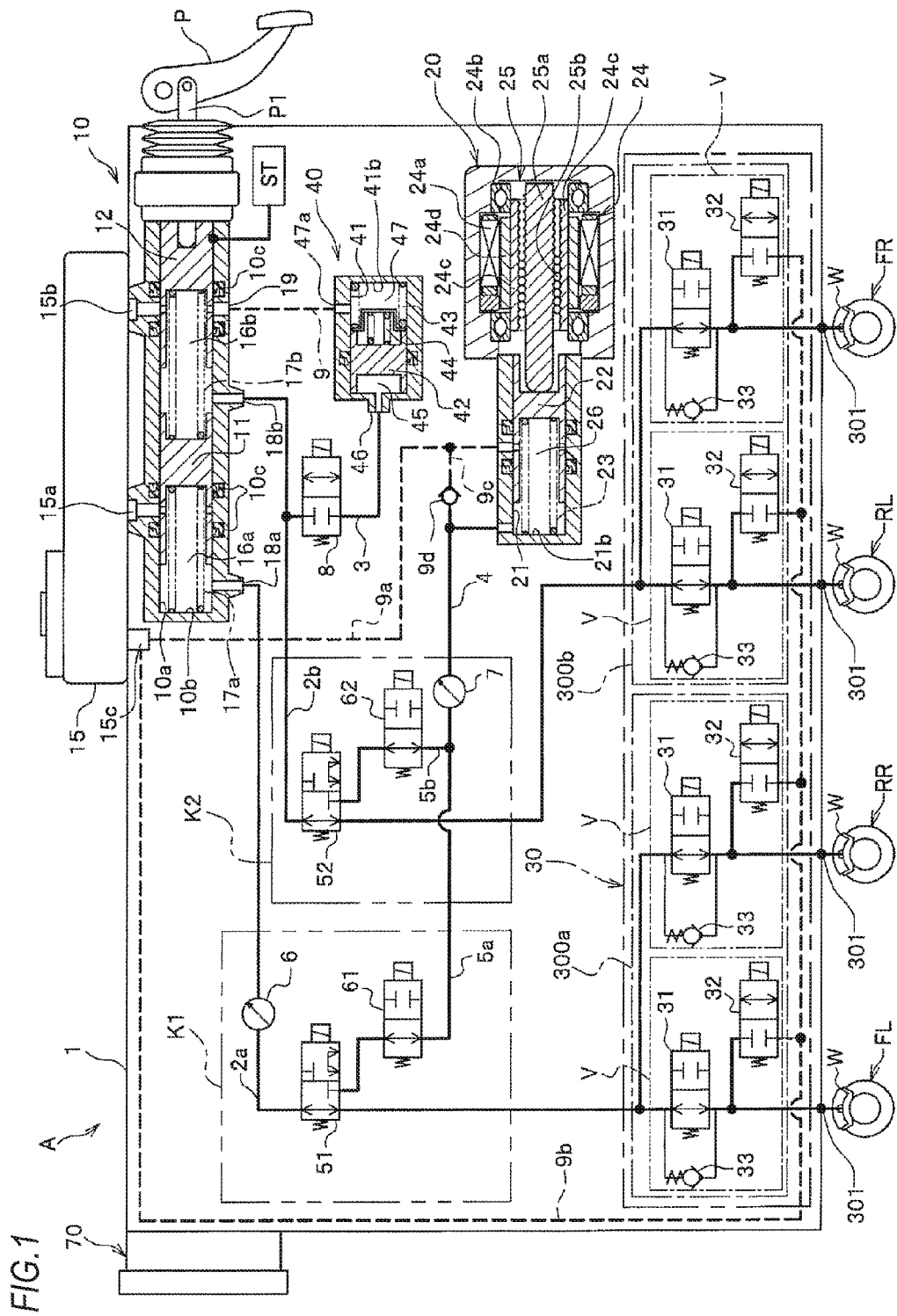
FIG. 1 is a hydraulic fluid circuit diagram showing a brake system according to an embodiment of the invention.

As shown in FIG. 1, a brake system A is such as to include both a brake-by-wire type brake system which operates when a prime mover (for example, an engine or an electric motor) is activated to operate and a hydraulic brake system which operates when the prime mover is stopped.

The brake system A includes mainly a master cylinder 10, a slave cylinder 20 and a fluid pressure control unit 30 as control valve modules. In addition to motor vehicles having only an engine (an internal combustion engine) as a power supply, the brake system A can also be mounted on hybrid electric vehicles which employ a motor as well as an engine and electric vehicles and fuel cell vehicles which employ only a motor as a power supply.

The master cylinder 10 is a tandem type master cylinder which has two pistons 11, 12. The master cylinder 10 generates a fluid pressure which is applied to wheel brakes FL, RR, RL, FR as a result of pedal effort being exerted on a brake pedal P (a brake operator) (based on a traveling amount of the brake pedal P). A stroke simulator 40 is connected to the master cylinder 10. The stroke simulator 40 gives pseudo operation reaction force to the brake pedal P.

The slave cylinder 20 generates a fluid pressure by driving an electric motor 24 (an electric actuator) based on a traveling amount of the brake pedal P. A fluid pressure generated by the slave cylinder 20 (hereinafter, referred to a "generated fluid pressure") is applied to wheel brakes FL, RR, RL, FR.

The fluid pressure control unit 30 controls fluid pressures applied to the wheel brakes to support the stabilization of behaviors of a vehicle.

In the brake system A of this embodiment, the master cylinder 10, the slave cylinder 20 and the fluid pressure control unit 30 are provided in a single base body 1 to thereby be configured as an integral unit.

A first brake system K1 and a second brake system K2 are provided in the base body 1. A first hydraulic fluid line 2a is provided in the first brake system K1, and this first hydraulic fluid line 2a establishes a communication from the master cylinder 10 to the two wheel brakes FL, RR. A second hydraulic fluid line 2b is provided in the second brake system K2, and this second hydraulic fluid Line 2b establishes a communication from the master cylinder 10 to the remaining wheel brakes RL, FR. Additionally, a branch hydraulic fluid line 3, a common hydraulic fluid line 4, a first communication line 5a, a second communication line 5b, a supply line 9a and a return fluid line 9b are formed in the base body 1. A first pressure sensor 6 is provided on the first hydraulic fluid line 2a. A second pressure sensor 7 is provided on the common hydraulic fluid line 4.

The master cylinder 10 includes the piston 11, which is a first piston, and the piston 12, which is a second piston, as well as two elastic members, which are a first elastic member 17a and a second elastic member 17b. The first piston 11 and the second piston 12 are inserted into a cylinder bore 10a which has a bottomed cylindrical shape, and the first elastic member 17a and the second elastic member 17b are accommodated in the cylinder bore 10a. A reservoir tank 15 which reserves a brake fluid is additionally attached to the master cylinder 10. The reservoir tank 15 includes first supply ports 15a, 15b which supply the brake fluid to the master cylinder 10 and a second supply port 15c which is independent of the first supply ports 15a, 15b. The supply line 9a and the return fluid line 9b are connected to the second supply port 15c.

A first pressure chamber 16a is defined between a bottom surface 10b of the cylinder bore 10a and the first piston 11. A first elastic member 17a, which is a coil spring, is interposed in the first pressure chamber 16a.

A second pressure chamber 16b is defined between the first piston 11 and the second piston 12. A second elastic member 17b, which is a coil spring, is interposed in the second pressure chamber 16b.

A plurality of cup seals 10c, 10c are installed in an inner circumferential surface of the cylinder bore 10a.

An end portion of the second piston 12 is connected to the brake pedal P via a push rod P1. The first piston 11 and the second piston 12 slide within the cylinder bore 10a as a result of the pedal effort exerted on the brake pedal P being applied thereto so as to pressurize the brake fluid in both the pressure chambers 16a, 16b. The brake fluid which is pressurized in both the pressure chambers 16a, 16b is outputted through output ports 18a, 18b which are provided in the cylinder bore 10a.

The first hydraulic fluid line 2a is connected to the output port 18a, and the second hydraulic fluid line 2b is connected to the output port 18b. The first hydraulic fluid line 2a and the second hydraulic fluid line 2b are connected to the fluid pressure control unit 30 which lies on downstream.

A stroke sensor ST for detecting a stroke of the second piston 12 is assembled to the master cylinder 10.

The stroke simulator 40 includes a simulator piston 42 which is inserted into a simulator cylinder bore 41 and two elastic members 43, 44 which are interposed between a bottom surface 41b of the simulator cylinder bore 41 and the simulator piston 42.

A pressure chamber 45 is defined within the simulator cylinder bore 41. The pressure chamber 45 is provided between an induction port 46 and the simulator piston 42 and communicates with the second pressure chamber 16b of the master cylinder 10 via the branch hydraulic fluid line 3, the second hydraulic fluid line 2b and the output port 18b. Consequently, as a hydraulic pressure is generated in the second pressure chamber 16b of the master cylinder 10 by the brake pedal P which is operated, the simulator piston 42 of the stroke simulator 40 moves against biasing force of the elastic members 43, 44. This gives a pseudo operation reaction force to the brake pedal P. A reservoir tank communication line 9 is connected to a back pressure chamber 47 where the elastic members 43, 44 are disposed via a port 47a. The reservoir tank communication line 9 communicates with the reservoir tank 15 via a port 19 and the first supply port 15b of the master cylinder 10.

The slave cylinder 20 includes one slave cylinder piston 22 which is inserted into a cylinder bore 21, an elastic member 23 which is accommodated in the cylinder bore 21, the electric motor 24 and a drive transmitting portion 25.

A hydraulic fluid chamber 26 is formed between a bottom portion 21b of the cylinder bore 21 and the slave cylinder piston 22 (hereinafter, also referred to simply as the "piston 22" from time to time). An elastic member 23, which is a coil spring, is disposed in the hydraulic fluid chamber 26.

The hydraulic fluid chamber 26 communicates with the first hydraulic fluid line 2a by way of the common hydraulic fluid line 4 and the first communication line 5a and communicates with the second hydraulic fluid line 2b by way of the common hydraulic fluid line 4 and the second communication line 5b.

The electric motor 24 is an electric servomotor. The electric motor 24 includes a coil portion 24a and a rotating portion 24c which is supported on a bearing 24b. A magnet 24d is attached to the rotating portion 24c.

The drive transmitting portion 25 is provided inside the rotating portion 24c. The drive transmitting portion 25 converts rotational driving force of the electric motor 24 into a straight-line axial tension. The drive transmitting portion 25 includes a rod 25a which abuts the piston 22 and a plurality of balls 25b which are disposed between the rod 25a and the rotating portion 24c. A spiral thread groove is formed on an outer circumferential surface of the rod 25a, and the plurality of balls 25b are accommodated in this thread groove so as to roll freely therein. A distal end portion of the rod 25a (a portion facing the piston 22) is formed into a semispherical shape (refer to FIG. 2A). The rotating portion 24c is screwed on the plurality of balls 25b. In this way, a ball screw mechanism is provided between the rotating portion 24c and the rod 25a.

The electric motor 24 is controlled to be driven by an electronic control unit 70 which is a control unit to be mounted on the base body 1. A rotating angle sensor, not shown, is attached to the electric motor 24. A value detected by the rotating angle sensor is inputted into the electronic control unit 70. The electronic control unit 70 calculates a stroke amount of the piston 22 of the slave cylinder 20 based on the detected value of the rotating angle sensor.

When the rotating portion 24c of the electric motor 24 rotates, a straight-line axial tension is given to the rod 25a by the ball screw mechanism which is provided between the rotating portion 24c and the rod 25a, whereby the rod 25a moves back and forth in a reciprocating fashion.

When the rod 25a moves towards the piston 22, the piston 22 receives an input from the rod 25a to advance (moves in a pressurizing direction) within the cylinder bore 21, whereby the brake fluid within the hydraulic fluid chamber 26 is pressurized. On the contrary, when the rod 25a moves in an opposite direction to the piston 22, the piston 22 withdraws (moves in a depressurizing direction) within the cylinder bore 21 by means of biasing force of the elastic member 23, whereby the brake fluid within the hydraulic fluid chamber 26 is depressurized.

The fluid pressure control unit 30 controls the fluid pressure which is given to wheel cylinders W of the wheel brakes FL, RR, RL, FR as required. The fluid pressure control unit 30 includes a configuration which executes an anti-lock braking control and is connected to the wheel cylinders W by way of piping. In addition, the return fluid line 9b is connected to the fluid pressure control unit 30.

The wheel brakes FL, RR, RL, FR are connected to outlet ports 301 of the base body 1 via piping. At normal times, a fluid pressure corresponding to pedal effort exerted on the brake pedal P is outputted from the slave cylinder 20 and is then given to the wheel cylinders W of the wheel brakes FL, RR, RL, FR by way of both the hydraulic fluid lines 2a, 2b.

Hereinafter, in the fluid pressure control unit 30, a system which is connected to the first hydraulic fluid line 2a will be referred to as a "first hydraulic fluid system 300a" and a system which is connected to the second hydraulic fluid line 2b will be referred to as a "second hydraulic fluid system 300b."

Two control valve modules V are provided so as to correspond to the wheel brakes FL, RR in the first hydraulic fluid system 300a, and similarly, two control valve modules V are provided so as to correspond to the wheel brakes RL, FR in the second hydraulic fluid system 300b.

The control valve modules V control the passage of the hydraulic fluid from the slave cylinder 20 to the wheel brakes FL, RR, RL, FR (specifically speaking, the wheel cylinders W) so as to increase, hold or reduce a fluid pressure which is applied to the wheel cylinders W (hereinafter, referred to as a "wheel cylinder pressure"), Because of this, the control valves each include an inlet valve 31, an outlet valve 32 and a check valve 33.

Inlet valves 31 are disposed on each of two hydraulic fluid lines which extend from the first hydraulic fluid line 2a to the wheel brakes FL, RR and each of two hydraulic fluid lines which extend from the second hydraulic fluid line 2b to the wheel brakes RL, FR. The inlet valves 31 are a normally open proportional solenoid valve (a linear solenoid valve), and a difference in pressure between an upstream side and a downstream side of the inlet valve 31 (an opening pressure of the inlet valve 31) can be controlled based on a value of a drive current which is caused to flow to a coil of the inlet valve 31. Being left open at normal times, the inlet valves 31 permit the fluid pressure to be given to the wheel cylinders W from the slave cylinder 20. In addition, the inlet valves 31 are controlled to be closed by the electronic control unit 70 when wheels are about to lock an as to cut off the fluid pressure which is given to the wheel cylinders W.

The outlet valves 32 are normally closed solenoid valves which are disposed between the wheel cylinders W and the return fluid line 9b. The outlet valves 32 are closed at normal times and are controlled to be opened by the electronic control unit 70 when the wheels are about to lock. Opening the outlet valves 32 depressurizes the brake fluid acting on the wheel cylinders W.

The check valves 33 are connected in parallel to the inlet valves 31. The check valves 33 permit only a flow of brake fluid from the wheel cylinders W to the slave cylinder 20 (the master cylinder 10). Consequently, also when the inlet valves 31 are left closed, the check valves 33 permit the flow of brake fluid from the wheel cylinders W to the slave cylinder 20.

In the fluid pressure control unit 30, the wheel cylinder pressures at the wheel cylinders Ware controlled by controlling the opening and closing of the inlet valves 31 and the outlet valves 32 by the electronic control unit 70. For example, in a normal state where the inlet valves 31 are opened while the outlet valves 32 are closed, in the event that the brake pedal P is depressed, a fluid pressure from the slave cylinder 20 is transmitted directly to the wheel cylinders W to increase the wheel cylinder pressures. On the contrary, in the event that a state results in which the inlet valves 31 are closed while the outlet valves 32 are opened, the brake fluid flows out of the wheel cylinders W into the return fluid line 9b, whereby the wheel cylinder pressures are reduced for depressurization. Further, in such a state that both the inlet valves 31 and the outlet valves 32 are closed, the wheel cylinder pressures are held.

Next, the hydraulic fluid lines formed in the base body 1 will be described.

The two hydraulic fluid lines, which are the first hydraulic fluid line 2a and the second hydraulic fluid line 2b, both originate from the cylinder bore 10a of the master cylinder 10.

The first hydraulic fluid line 2a communicates with the first pressure chamber 16a of the master cylinder 10. On the other hand, the second hydraulic fluid line 2b communicates with the second pressure chamber 16b of the master cylinder 10. The first hydraulic fluid line 2a communicates with the wheel brakes FL, RR which lie at the downstream end thereof. On the other hand, the second hydraulic line 2b communicates with the wheel brakes RL, FR which lie at the downstream end thereof.

The branch hydraulic fluid line 3 extends from the second hydraulic fluid line 2b to reach the pressure chamber 45 of the stroke simulator 40. A normally closed solenoid valve 8 is provided on the branch hydraulic fluid line 3 as a valve. The normally closed solenoid valve 8 opens and closes the branch hydraulic fluid line 3.

The two communication lines, which are the first communication line 5a and the second communication line 5b, both originate from the hydraulic fluid chamber 26 of the slave cylinder 20. The first communication time 5a and the second communication line 5b merge with the common hydraulic fluid line 4 to thereby communicate with the cylinder bore 21. The first communication line 5a extends from the hydraulic fluid chamber 26 to reach the first hydraulic fluid line 2a, and the second communication line 5b also extends from the hydraulic fluid chamber 26 to reach the second hydraulic fluid line 2b.

Figure 2A:
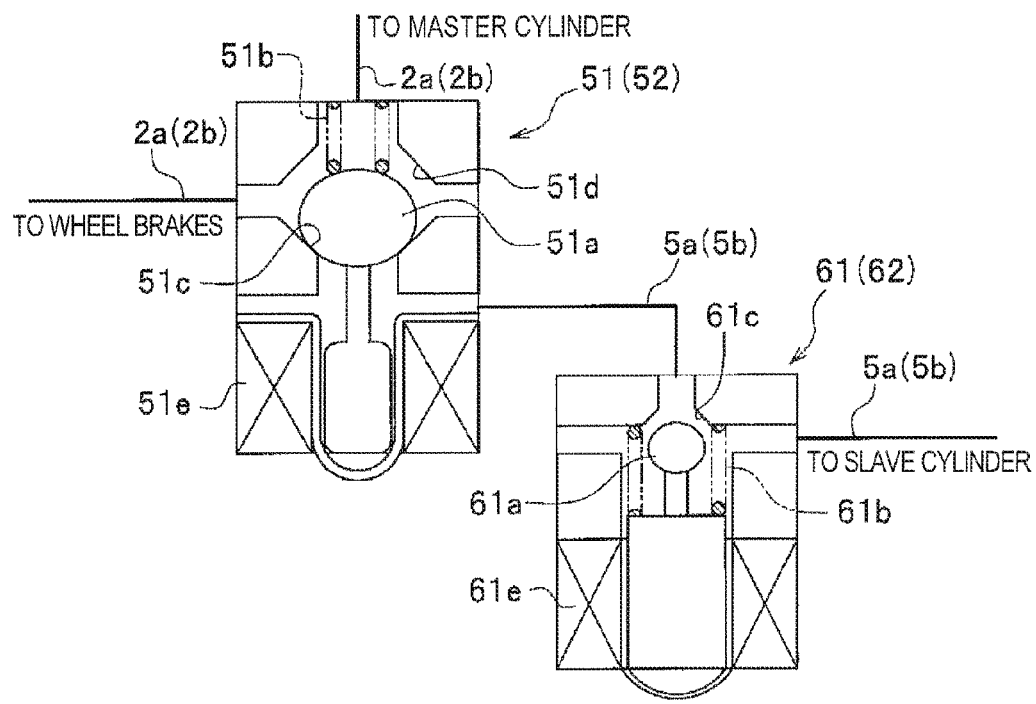
FIGS. 2A and 2B are explanatory diagrams showing schematically constructions of a switching valve and a cutoff valve.
Figure 2B:
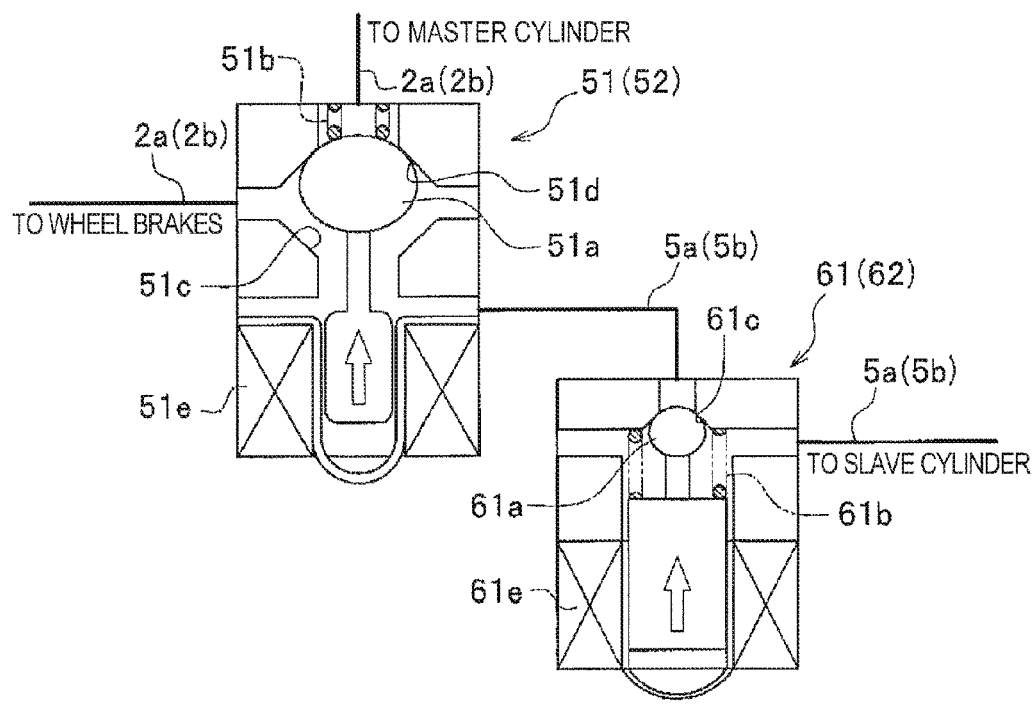

A first switching valve 51, which is a three-way valve, is provided at a connecting portion between the first hydraulic fluid line 2a and the first communication line 5a. The first switching valve 51 is a two-position, three-port solenoid valve. The first switching valve 51 can select a first position where a valve body 51a sits on a first valve seat 51c as shown in FIG. 2A and a second position where the valve body 51a sits on a second valve seat 51d as shown in FIG. 2B. In the first position, a communication is established between an upstream side (a master cylinder 10 side) of the first hydraulic fluid line 2a and a downstream side (a fluid pressure control unit 30 side, the wheel brakes FL, RR) of the first hydraulic fluid line 2a, and a passageway or a communication with the first communication line 5a is cutoff. Namely, with the first switching valve 51 switched to the first position, the wheel brakes FL, RR communicate with the master cylinder 10, but a communication between the slave cylinder 20 and the wheel brakes FL, RR is cut off (resulting in a non-communicating state). In the first position, the valve body 51a sits on the first valve seat 51c by means of biasing force of a return spring 51b because a coil 51e is de-energized. In the second position, as shown in FIG. 2B, a communication with the upstream side of the first hydraulic fluid line 2a is cut off, while a communication is established between the first communication line 5a and the downstream side of the first hydraulic fluid line 2a. Namely, with the first switching valve 51 switched to the second position, the wheel brakes FL, RR are cut off from the master cylinder 10 (resulting in a non-communicating state) but are allowed to communicate with the slave cylinder 20. In the second position, the valve body 51a sits on the second valve seat 51d by means of magnetic force of the coil 51e because the coil 51e is energized.

On the other hand, a second switching valve 52, which is a three-way valve, is provided at a connecting portion between the second hydraulic fluid line 2b and the second communication line 5b. The second switching valve 52 is a two-position, three-port solenoid valve. The second switching valve 52 can select a first position where a valve body 51a sits on a first valve seat 51c as shown in FIG. 2A and a second position where the valve body 51a sits on a second valve seat 51d as shown in FIG. 2B. In the first position, a communication is established between an upstream side (a master cylinder 10 side) of the second hydraulic fluid line 2b and a downstream side (a fluid pressure control unit 30 side, the wheel brakes RL, FR) of the second hydraulic fluid line 2b, and a passageway or a communication with the second communication line 5b is cutoff. Namely, with the second switching valve 52 switched to the first position, the wheel brakes RL, FR communicate with the master cylinder 10, but a communication between the slave cylinder 20 and the wheel brakes RL, FR is cut off (resulting in a non-communicating state). In the first position, the valve body 51a sits on the first valve seat 51c by means of biasing force of a return spring 51b because a coil 51e is de-energized. In the second position, as shown in FIG. 2B, a communication with the upstream side of the second hydraulic fluid line 2b is cut off, while a communication is established between the second communication line 5b and the downstream side of the second hydraulic fluid line 2b, Namely, with the second switching valve 52 switched to the second position, the wheel brakes RL, FR are cut off from the master cylinder 10 (resulting in a non-communicating state) but are allowed to communicate with the slave cylinder 20. In the second position, the valve body 51a sits on the second valve seat 51d by means of magnetic force of the coil 51e because the coil 51e is energized.

The first switching valve 51 and the second switching valve 52 are controlled to switch their positions by the electronic control unit 70. Incidentally, in the first switching valve 51 and the second switching valve 52, the valve bodies 51a are in the first positions when the brake system is activated to operate or in a backup mode in which a fluid pressure is applied directly to the wheel cylinders W from the master cylinder 10. In the first switching valve 51 and the second switching valve 52, the valve bodies 51a in the second positions when the brakes are applied normally with a fluid pressure applied to the wheel cylinders W from the slave cylinder 20.

A first cutoff valve 61 is provided on the first communication line 5a. The first cutoff valve 61 is a normally open solenoid valve and opens and closes the first communication line 5a. As shown in FIG. 2A, a valve body 61a stays away from a valve seat 61c by means of biasing force of a return spring 61b when a coil 61e is not energized, whereby a communication with the first communication line 5a is established. In addition, as shown in FIG. 2B, the valve body 61a sits on the valve seat 61c by means of magnet force to cut off the communication with the first communication line 5a when the coil 61e is energized. When closed, the valve body 61a of the first cutoff valve 61 is pressed against the valve seat 61c from a slave cylinder 20 side which is an upstream side (a fluid force generating source side). The opening and closing of the first cutoff valve 61 (an energizing control of the coil 61e) is executed by the electronic control unit 70.

A second cutoff valve 62 is provided on the second communication line 5b. The second cutoff valve 62 is a normally open solenoid valve and opens and closes the second communication line 5b. As shown in FIG. 2A, a valve body 61a stays away from a valve seat 61c by means of biasing force of a return spring 61b when a coil 61e is not energized, whereby a communication with the second communication line 5b is established. In addition, as shown in FIG. 2B, the valve body 61a sits on the valve seat 61c by means of magnet force to cut off the communication with the second communication line 5b when the coil 61e is energized. When closed, the valve body 61a of the second cutoff valve 62 is pressed against the valve seat 61c from a slave cylinder 20 side which is an upstream side (a fluid force generating source side). The opening and closing of the second cutoff valve 62 (an energizing control of the coil 61e) is executed by the electronic control unit 70.

The two pressure sensors 6, 7 both detect a magnitude of a brake fluid pressure. Pieces of information obtained by both the pressure sensors 6, 7 (detection values) are inputted into the electronic control unit 70.

The one pressure sensor 6 is disposed on the first hydraulic fluid line 2a between the master cylinder 10 and the first switching valve 51. The pressure sensor 6 functions as master cylinder pressure sensor for detecting a fluid pressure generated in the master cylinder 10.

The other pressure sensor 7 is disposed on the common hydraulic fluid line 4. The pressure sensor 7 detects a fluid pressure generated in the slave cylinder 20.

The supply line 9a extends from the reservoir tank 15 to reach the slave cylinder 20. The supply line 9a is connected to the common hydraulic fluid line 4 by way of a branch supply line 9c. A check valve 9d is provided on the branch supply line 9c, and this check valve 9d permits only a flow of brake fluid from the reservoir tank 15 to the common hydraulic fluid line 4 (the slave cylinder 20). The brake fluid is supplied to the slave cylinder 20 from the reservoir tank 15 through the supply line 9a at normal times. When a fluid suction control, which will be described later, is executed, the brake fluid is sucked into the slave cylinder 20 from the reservoir tank 15 (the second supply port 15c) by way of the supply line 9a, the branch supply line 9c and the common hydraulic fluid line 4.

The return fluid line 9b extends from the fluid pressure control unit 30 to reach the reservoir tank 15. The brake fluid which is released from the wheel cylinders W flows into the return fluid line 9b via the outlet ports 32 of the fluid pressure control unit 30. The brake fluid released into the return fluid line 9b is returned to the reservoir tank 15 from the return fluid line 9b via the second supply port 15c.

The electronic control unit 70 accommodates a control circuit board (not shown) in an interior thereof, and the control circuit board is affixed to a side surface of the base body 1. The electronic control unit 70 controls the opening and closing of the normally closed solenoid valve 8, the operation of the electric motor 24, the operation of both the switching valves 51, 52, the opening and closing of both the cutoff valves 61, 62 and the opening and closing of the control valve modules V of the fluid pressure control unit 30 based on pieces of information (detection values) obtained from the various sensors such as the pressure sensors 6, 7 and the stroke sensor ST and a program stored in advance therein.

Figure 3:
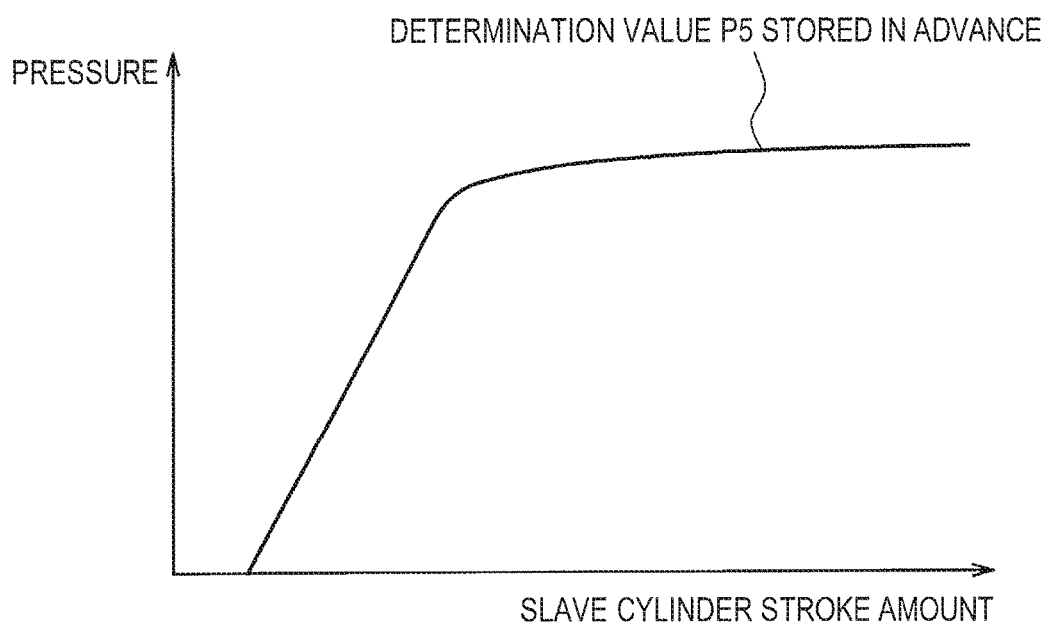
FIG. 3 is a diagram showing a relationship between a stroke amount and a pressure in a slave cylinder.

The electronic control unit 70 controls the driving of the electric motor 24 and the operations of the first switching valve 51, the second switching valve 52, the first cutoff valve 61 and the second cutoff valve 62. Additionally, the electronic control unit 70 includes a function (a function as a determination module), as a program stored in advance therein, to determine whether or not a fluid pressure generated by the slave cylinder 20 has risen to a fluid pressure which corresponds to a stroke amount of the piston 22 of the slave cylinder 20 (whether or not a fluid pressure generated by the slave cylinder 20 has risen to a determination value which is programmed in advance) by referring to a map shown in FIG. 3. Then, the electronic control unit 70 controls the slave cylinder 20, both the switching valves 51, 52, and both the cutoff valves 61, 62 based on the results of the determination. The details of the control carried out by the electronic control unit 70 based on the determination thereof will be described later.

In addition, the electronic control unit 70 includes a function to execute the fluid suction control. In the fluid suction control, the brake fluid is sucked positively from the supply line 9*a* into the slave cylinder 20 so as to secure the brake fluid in the slave cylinder 20. For example, this fluid suction control is executed to secure the brake fluid in the slave cylinder 20 to such a level that allows the slave cylinder 20 to be pressurized to a high fluid pressure area or to secure the brake fluid in advance for preparation for a further pressurization to be executed after the fluid pressure being generated by the slave cylinder 20 has reached a fluid pressure required by the driver (hereinafter, this state will be referred to as a "steady state"). The details of the fluid suction control will be described later.

Next, the operation of the brake system will briefly be described.

(Normal Brake Control)

In the brake system A, when the brake system is activated to operate, the normally closed solenoid valve 8 of the branch hydraulic fluid line 3 is opened. In this state, a fluid pressure generated in the master cylinder 10 by operating the brake pedal P is not transmitted to the wheel cylinders W but is transmitted to the stroke simulator 40. Then, the fluid pressure in the pressure chamber 45 is increased, and this moves the simulator piston 42 towards the bottom surface 41*b* against the biasing force of the elastic members 43, 44, whereby the brake pedal P is permitted to stroke, and pseudo operation reaction force is given to the brake pedal P.

Figure 4:
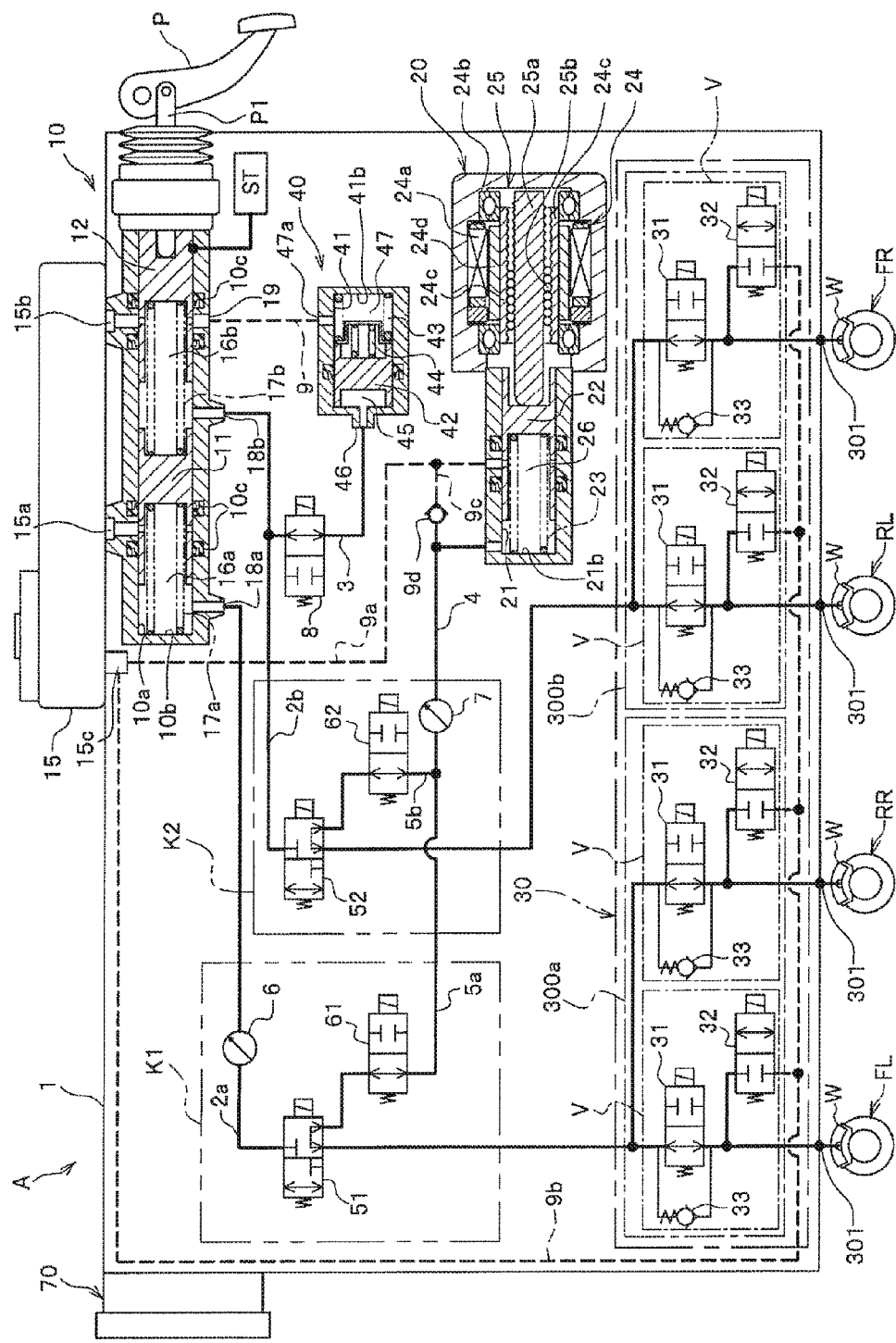
FIG. 4 is a hydraulic fluid circuit diagram when the brake system shown in FIG. 1 is activated to operate.

When the stroke sensor ST detects that the brake pedal P has been operated, as shown in FIG. 4, the first switching valve 51 and the second switching valve 52 are excited, and the valve bodies 51*a* move to the second positions (refer to FIG. 2B). As a result of such move of the valve bodies 51*a*, a communication between the downstream side (the wheel brake side) of the first hydraulic fluid line 2*a* and the first communication line 5*a* is established by the first switching valve 51, and a communication between the downstream side of the second hydraulic fluid line 2*b* and the second communication line 5*b* is established by the second switching valve 52. Namely, a state results in which the communication between the master cylinder 10 and the wheel cylinders W is cut off (a non-communicating state), while a state results in which a communication between the slave cylinder 20 and the wheel cylinders W is established.

Additionally, when the stroke sensor ST detects that the brake pedal P has been operated, the electronic control unit 70 drives the electric motor 24 of the slave cylinder 20, and this moves the piston 22 of the slave cylinder 20 towards the bottom portion 21*b*, whereby the brake fluid within the hydraulic fluid chamber 26 is pressurized.

The electronic control unit 70 compares a fluid pressure generated in the slave cylinder 20 (a fluid pressure detected by the pressure sensor 7) with a fluid pressure outputted from the master cylinder 10 (a fluid pressure corresponding to a traveling amount of the brake pedal P) and then controls the rotation speed of the electric motor 24 based on the results of the comparison. In this way, the fluid pressure is increased in the brake system A.

The fluid pressure generated in the slave cylinder 20 is transmitted to the wheel cylinders W by way of the fluid pressure control unit 30 to thereby activate the wheel cylinders W to operate, which gives braking force to the wheels.

When the depression of the brake pedal P is released, the electronic control unit 70 drives the electric motor 24 of the slave cylinder 20 reversely, and the piston 22 is returned towards the electric motor 24 by the elastic member 23. This depressurizes the interior of the hydraulic fluid chamber 26, whereby the operation of the wheel cylinders W is cancelled.

(Brake Control Executed when Brake Fluid is Reduced)

Figure 5:
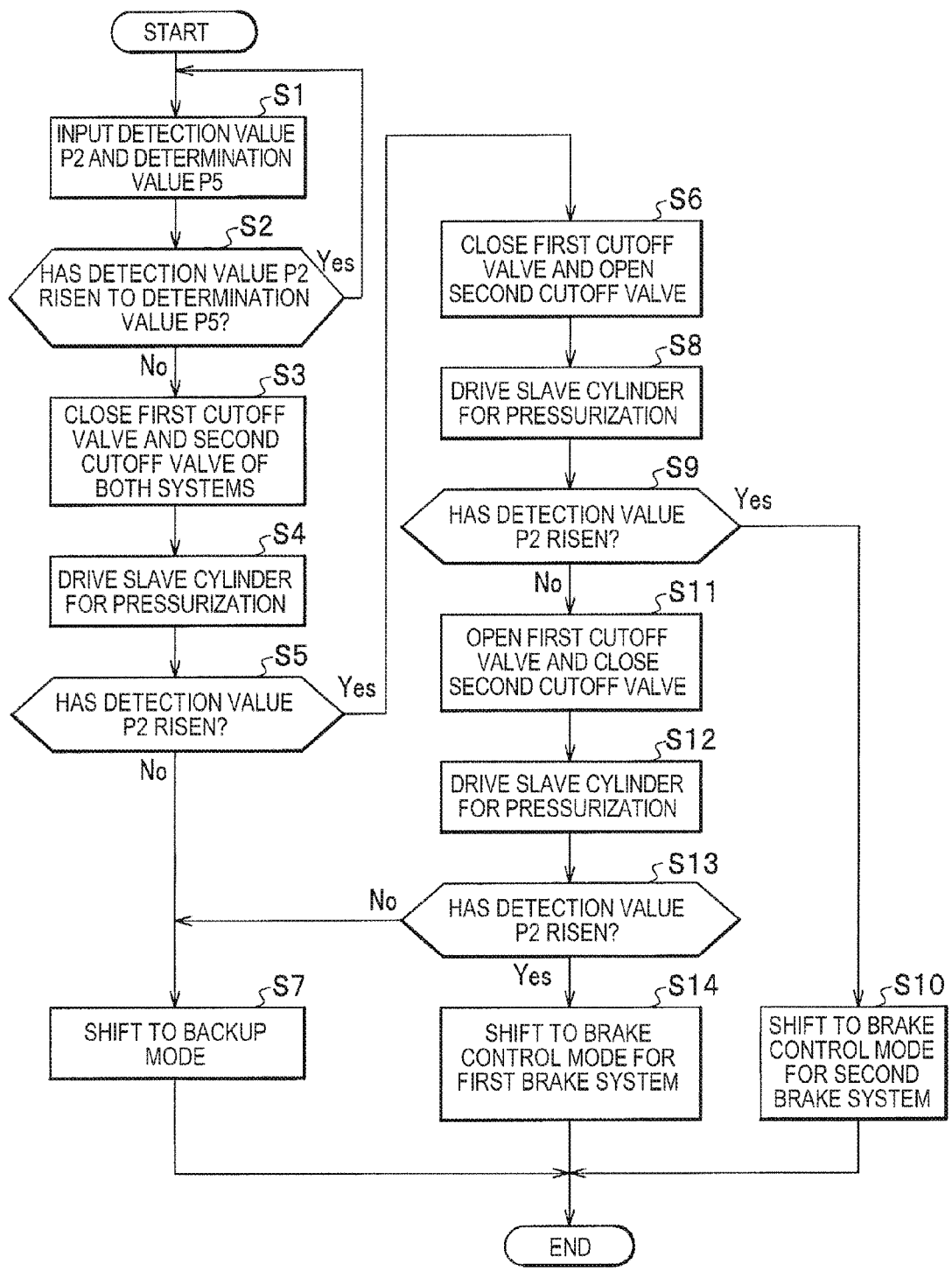
FIG. 5 is a flowchart showing a diagnosis procedure when a reduction in brake fluid occurs.

Next, referring to a flowchart shown in FIG. 5, a brake control will be described which is to be executed in the event of the brake fluid in either of the first hydraulic fluid line 2*a* and the second hydraulic fluid line 2*b* being reduced with the electric motor 24 of the slave cylinder 20 driven. As this occurs, a reduction of the brake fluid will be diagnosed through three stages which will be described as below.

Firstly, in step S1, a detection value P2 of the pressure sensor 7 and a determination value 95 (refer to FIG. 3) which is programmed in advance are inputted into the electronic control unit 70.

Thereafter, in step S2, the electronic control unit 70 determines whether or not the detection value P2 of the pressure sensor 7 has risen to the determination value 95. Namely, the electronic control unit 70 determines whether or not the fluid pressure generated in the slave cylinder 20 (the detection value P2) has risen to the fluid pressure which corresponds to the stroke amount of the piston 22 of the slave cylinder 20. If the electronic control unit 70 determines in step S2 that the detection value 92 of the pressure sensor 7 has risen to the determination value 95 (step S2, Yes), then, the brake control returns to step S1, so that steps S1, S2 are repeated.

If the electronic control unit 70 determines in step S2 that the detection value P2 of the pressure sensor 7 has not yet risen to the determination value P5 (In step S2, No, or if the electronic control unit 70 determines that something abnormal is happening), the brake control proceeds to step S1, where a diagnosis of a first stage for the reduction of the brake fluid is started.

In the diagnosis of the first stage, firstly, both the cutoff valves 61, 62 are closed in step S3, and the slave cylinder 20 is driven to perform a pressurizing operation in step S4 (the electric motor 24 is driven so that the piston 22 moves towards the bottom portion 21*b*).

When the slave cylinder 20 is driven and starts the pressurizing operation, in step S5, the electronic control unit 70 determines whether or not the detection value P2 of the pressure sensor 7 has risen (has been restored) compared with the detection value P2 resulting before both the cutoff valves 61, 62 are closed.

If the electronic control unit 70 determines in step S5 that the detection value P2 of the pressure sensor 7 has not yet so risen (step S5, No), the brake control proceeds to step S7, where a control based on a backup mode is started in which the fluid pressure is applied directly to the wheel cylinders W from the master cylinder 10. Namely, if the electronic control unit 70 determines in step S5 that the detection value P2 of the pressure sensor 7 has not yet risen, since this means that there is a possibility of the reduction of the brake fluid occurring somewhere in the hydraulic fluid lines from the first cutoff valve 61 and the second cutoff valve 62 to the slave cylinder 20, the excitation of the first switching valve 51 and the second switching valve 52 is released. This switches the valve bodies 51a to the first positions as shown in FIG. 2A. The switching of the valve bodies 51a allows the first hydraulic fluid line 2a and the second hydraulic fluid line 2b to communicate with the wheel brakes. Namely, the wheel brakes communicate with the master cylinder 10, and the communication between the wheel brakes and the slave cylinder 20 is cut off.

Additionally, if the electronic control unit 70 determines in step S5 that the detection value P2 of the pressure sensor 7 has not yet risen (step S5, No), the normally closed solenoid valve 8 on the branch hydraulic fluid line 3 is closed (the flow of the brake fluid from the master cylinder 10 to the stroke simulator 40 is stopped). This allows the fluid pressure generated in the master cylinder 10 to be transmitted directly to the wheel cylinders W (the wheel brakes) by way of the first hydraulic fluid line 2a and the second hydraulic fluid line 2b.

If the electronic control unit 70 determines in step S5 that the detection value 92 of the pressure sensor 7 has risen (step S5, Yes), a diagnosis of a second stage is started. As this occurs, the brake control proceeds to step S6, where the first cutoff valve 61 is kept closed, while the second cutoff valve 62 is opened. Thereafter, the slave cylinder 20 is driven to perform a pressurizing operation in step S8.

After the slave cylinder 20 is driven to perform the pressurizing operation, the electronic control unit 70 determines in step S9 whether or not the detection value P2 of the pressure sensor 7 has risen (has been restored) compared with the detection value P2 resulting before the first cutoff valve 61 is closed (the second stage).

If the electronic control unit 70 determines in step S9 that the detection value 92 of the pressure sensor 7 has risen (step S9, Yes), the brake control proceeds to step S10, where the brake control is shifted to a brake control mode for the second brake system K2. Namely, if the detection value P2 of the pressure sensor 7 has risen as a result of the first cutoff valve 61 being closed, since this means that there is a possibility of the reduction of the brake fluid occurring somewhere in the hydraulic fluid lines of the first brake system K1, the slave cylinder 20 is kept raising the fluid pressure in the second brake system K2. Namely, the braking by the slave cylinder 20 (the brake control mode) is secured by the second brake system K2. The communication between the first hydraulic fluid line 2a and the slave cylinder 20 continues to be cut off.

On the other hand, if the electronic control unit 70 determines in step S9 that the detection value P2 of the pressure sensor 7 has not yet risen (step S9, No), a diagnosis of a third stage is started. As this occurs, the brake control proceeds to step S11, where the first cutoff valve 61 is opened, and the second cutoff valve 62 is closed. Thereafter, in step S12, the slave cylinder 20 is driven to perform a pressurizing operation.

After the slave cylinder 20 has been driven to perform a pressurizing operation, the electronic control unit 70 determines in step S13 whether or not the detection value P2 of the pressure sensor 7 has risen (has been restored) compared with the detection value P2 resulting before step S12.

If the electronic control unit 70 determines in step S13 that the detection value P2 of the pressure sensor 7 has risen (step S13, Yes), the brake control proceeds to step S14, where the brake control is shifted to a brake control mode for the first brake system K1. Namely, if the detection pressure P2 of the pressure sensor 7 has risen as a result of the second cutoff valve 62 being closed, since this means that there is a possibility that the brake fluid is being reduced somewhere in the hydraulic fluid lines of the second brake system K2, the slave cylinder 20 is kept raising the fluid pressure in the first brake system K1. Namely, the braking by the slave cylinder 20 (the brake control mode) is secured by the first brake system K1. The communication between the second hydraulic fluid line 2b and the slave cylinder 20 continues to be cut off.

If the electronic control unit 70 determines in step S13 that the detection value P2 of the pressure sensor 7 has not yet risen (step S13, No), the brake control proceeds to step S7, where a control based on the backup mode is started in which the fluid pressure is applied directly to the wheel cylinders W from the master cylinder 10.

In such a state that the slave cylinder 20 is kept inoperable (for example, in such a state that an ignition switch is in an OFF position or no electric power is available), the first switching valve 51, the second switching valve 52 and the normally closed solenoid valve 8 return to their initial states (refer to FIG. 1). When the first switching valve 51 and the second switching valve 52 return to their initial states, the first hydraulic fluid line 2a and the second hydraulic fluid line 2b communicate with the wheel cylinders W. In this state, the fluid pressure generated in the master cylinder 10 is transmitted directly to the wheel cylinders W.
(Fluid Suction Control)

Next, the fluid suction control will be described. The fluid suction control is a control to suck the brake fluid from the reservoir tank 15 into the hydraulic fluid chamber 26 of the slave cylinder 20 so as to secure the brake fluid therein. An amount of brake fluid which is required for normal (usual) braking other than a specific situation of a panic brake is secured in the hydraulic fluid chamber 26.

Figure 6:
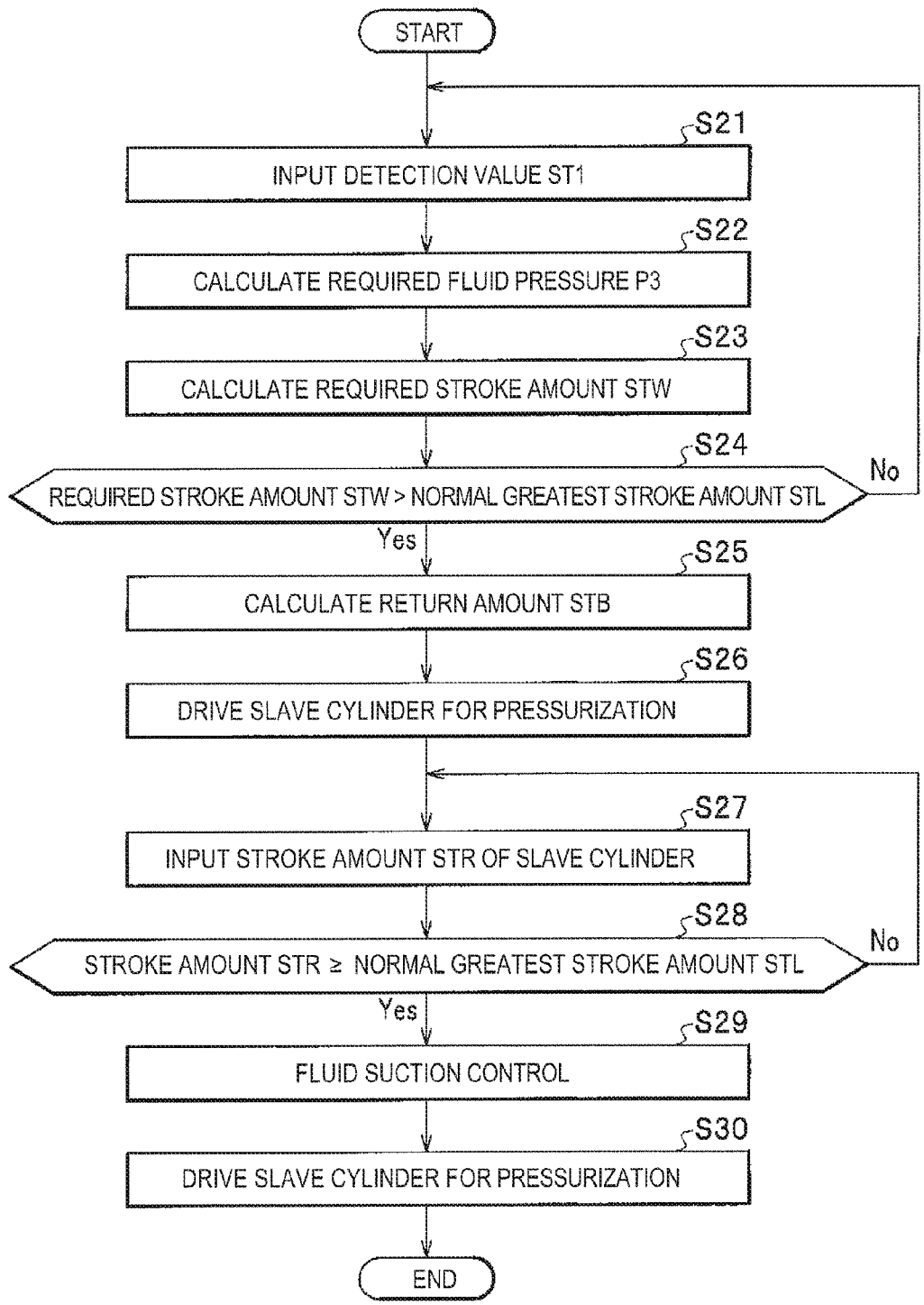
FIG. 6 is a flowchart showing steps taken to reach a fluid suction control.

Initially, a fluid suction control will be described which is executed when the brakes are applied in a specific situation such as a situation of a panic brake which requires a greatest fluid pressure that the brake system can generate. When the brakes are applied in a specific situation of a panic brake, a higher fluid pressure is required which is higher than a fluid pressure which is required when the brakes are controlled normally. In the event of a situation occurring which requires a panic brake, in the slave cylinder 20, a fluid suction control is executed in which the piston 22 which has slid in the cylinder bore 21 in a pressurizing direction to a position where the piston 22 is about to come into abutment with the bottom portion 21b of the cylinder bore 21 is returned in a depressurizing direction (is returned towards the electric motor 24). Hereinafter, referring to FIGS. 6 to 8, this fluid suction control will be described in detail. FIG. 6 is a flowchart explaining a fluid suction control which requires a greatest wheel cylinder pressure that the brake system can generate, and FIG. 7 is a map showing a relationship between a fluid pressure generated by the slave cylinder and a stroke amount required for generation of the fluid pressure.

Initially, in step S21 in FIG. 6, a detection value ST1 of the stroke sensor ST is inputted into the electronic control unit 70, and in step S22, the electronic control unit 70 calculates a required fluid pressure P3 required by the driver based on the detection value ST1.

Figure 7:
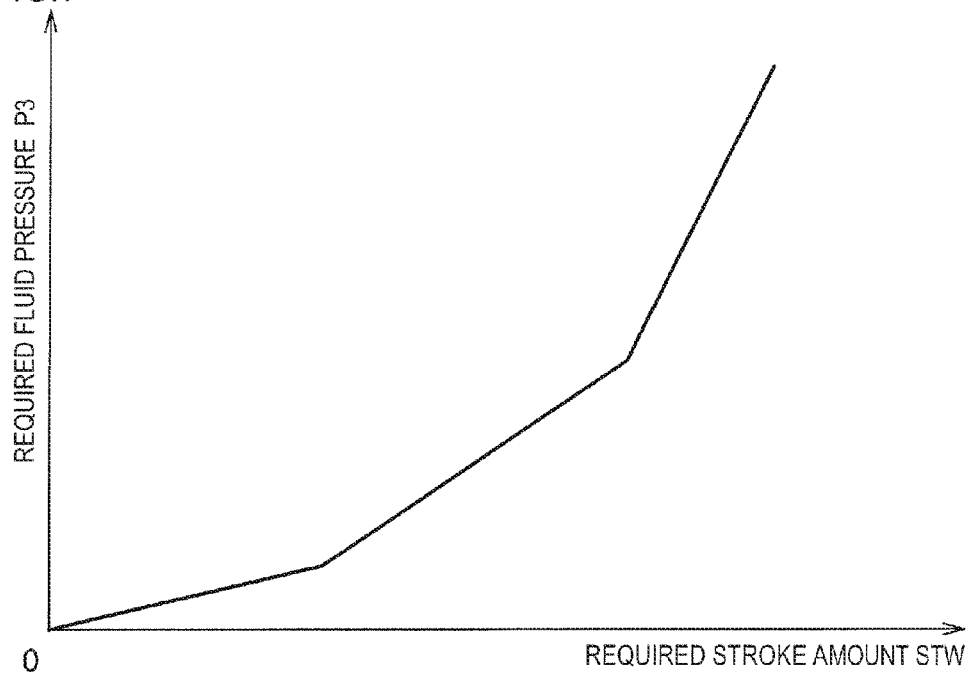
FIG. 7 is a diagram showing a relationship between required fluid pressure and required stroke amount.

Thereafter, in step S23, the electronic control unit 70 calculates a required stroke amount STW of the piston 22 which corresponds to the required fluid pressure P3 based on the map shown in FIG. 7.

Thereafter, in step S24, the electronic control unit 70 determines whether or not the required stroke amount STW calculated exceeds a normal greatest stroke amount (a limit stroke amount) STL. The limit stroke amount STL is set as a traveling distance of the piston 22 when the piston 22 travels from its initial position to the position where the piston 22 is about to come into abutment with the bottom portion 21b of the cylinder bore 21 during a pressurizing operation. Namely, the electronic control unit 70 determines in step S24 whether or not the required fluid pressure P3 required by the driver can be generated by a stroke amount which falls within the limit stroke amount STL.

If the electronic control unit 70 determines in step S24 that the required stroke amount STW is smaller than the limit stroke amount STL (step S24, No), the fluid suction control returns to step S21, where the steps S22, S23 will be repeated.

If the electronic control unit 70 determines in step S24 that the required stroke amount STW is greater than the limit stroke amount STL (step S24, Yes), the fluid suction control proceeds to step S25, where the electronic control unit 70 calculates a reverse stroke amount or return amount STB of the piston 22. Namely, in the event of the limit stroke amount SIL being unable to suffice the required fluid pressure P3 required by the driver, in order to execute a pressurization which exceeds the limit stroke amount STL, the piston 22 is returned once in the depressurizing direction for preparation of a re-pressurization. The return amount STB can be calculated based on the map shown in FIG. 7.

Thereafter, in step S26, the electronic control unit 70 starts driving the slave cylinder 20 for pressurization. Then, in the following step S27, a stroke amount STR (a total stroke amount) of the piston 22 of the slave cylinder 20 is inputted into the electronic control unit 70.

Thereafter, the electronic control unit 70 determines in step S28 whether or not the stroke amount SIR inputted thereinto becomes equal to or greater than the limit stroke amount STL. If the electronic control unit 70 determines in step S28 that the stroke amount DTR, inputted thereinto does not become equal to or greater than the limit stroke amount STL (step S28, No), the fluid suction control returns to step S27.

If the electronic control unit 70 determines in step S28 that the stroke amount SIR inputted becomes equal to or greater than the limit stroke amount SIL (step S28, Yes), the fluid suction control proceeds to step S29, where a fluid suction control is started.

When the fluid suction control is started, the electronic control unit 70 controls the first cutoff valve 61 and the second cutoff valve 62 to be closed. As this occurs, in the first cutoff valve 61 and the second cutoff valve 62, the valve bodies 61a are closed from the slave cylinder 20 side towards the wheel brake side (the valve bodies 61a are closed by receiving the biasing force of the return springs 61b), and therefore, when the valve bodies 61a are closed, by receiving the fluid pressure from the slave cylinder 20 side, the valve bodies 61a sit on the corresponding valve seats 61c smoothly (refer to FIGS. 2A, 2B). Fluid pressures at the downstream sides of the first cutoff valve 61 and the second cutoff valve 62 are held by the closure of the first cutoff valve 61 and the second cutoff valve 62.

Thereafter, the electronic control unit 70 drives the electric motor 24 in the depressurizing direction (in the reversing or returning direction) by an amount corresponding to the return amount STB which is calculated in step S25. Then, the piston 22 is returned in the depressurizing direction, whereby the hydraulic fluid chamber 26 is depressurized to produce a negative pressure condition therein while holding the fluid pressures at the wheel cylinders W. This enables the brake fluid in the reservoir tank 15 to be sucked into the hydraulic fluid chamber 26 from the reservoir tank 15 by way of the supply line 9a and the common hydraulic fluid line 4. As this occurs, an amount of the brake fluid sucked in is based on the return amount STB and should be such as to complement the pressurization.

Thereafter, in step S30, the electronic control unit 30 drives the piston 22 in the pressurizing direction again and controls the first cutoff valve 61 and the second cutoff valve 62 to be opened. This raises the wheel cylinder pressures V1 again to thereby obtain a wheel cylinder pressure V1 which corresponds to the required fluid pressure P3 required by the driver.

As to a timing at which the first cutoff valve 61 and the second cutoff valve 62 are opened, the first cutoff valve 61 and the second cutoff valve 62 should be opened at, for example, a timing at which the piston 22 is driven in the pressurizing direction after the piston 22 has been driven in the returning direction and a fluid pressure SCV generated in the slave cylinder 20 becomes the same as the fluid pressures on the downstream sides of the first cutoff valve 61 and the second cutoff valve 62 (the wheel cylinder pressures V1) or at a timing just before the timing at which the generated fluid pressure SCV becomes the same as the downstream fluid pressures of the first cutoff valve 61 and the second cutoff valve 62. Opening the first cutoff valve 61 and the second cutoff valve 62 at this timing produces no difference in fluid pressure between the upstream sides and the downstream sides of the first cutoff valve 61 and the second cutoff valve 62, and therefore, not only can the valve opening operation be performed smoothly but also a natural pressure rising characteristic can be obtained. The first cutoff valve 61 and the second cutoff valve 62 can also be opened at a timing after the timing at which the fluid pressure SCV generated in the slave cylinder 20 becomes the same as the downstream fluid pressures of the first cutoff valve 61 and the second cutoff valve 62. In this case, the first cutoff valve 61 and the second cutoff valve 62 should be opened before the downstream fluid pressures of the first cutoff valve 61 and the second cutoff valve 62 become a pressure resulting from adding a load on the return spring 61b to the generated fluid pressure SCV.

Figure 8:
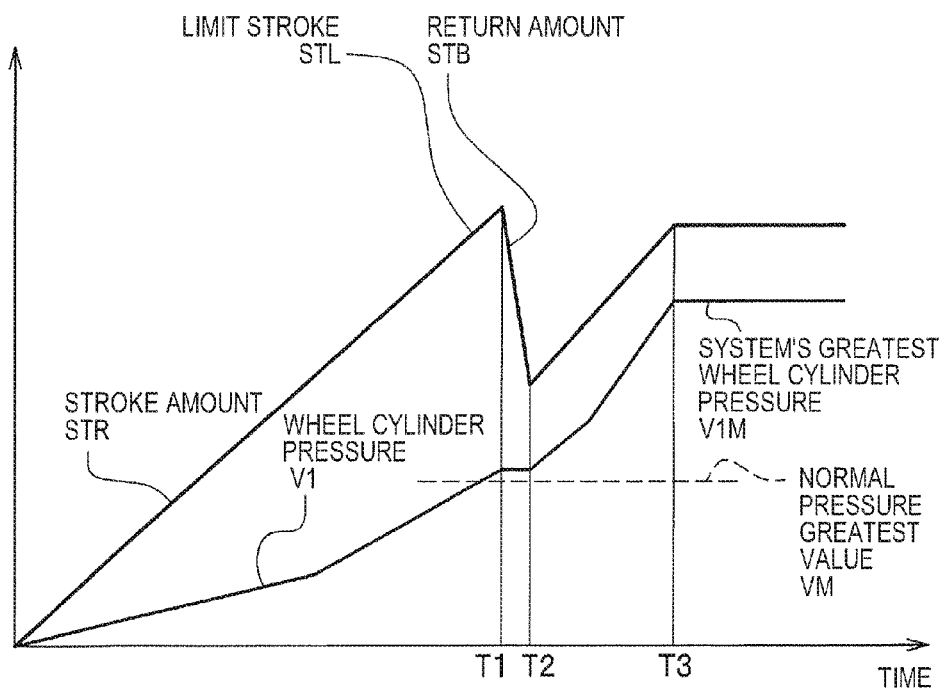
FIG. 8 is a timing chart showing timings at which the fluid suction control is executed when a greatest wheel cylinder pressure in the brake system is required.

FIG. 8 is a timing chart showing timings at which the fluid suction control is executed when a greatest wheel cylinder pressure NIM in the brake system is required. As shown in FIG. 8, when the piston 22 of the slave cylinder 20 is driven in the pressurizing direction and the stroke amount SIR reaches the limit stroke amount SIL at a time t1, the fluid suction control is started (a start timing of the fluid pressure control). Namely, the wheel cylinder pressure V1 is raised to a normal pressure greatest value VM (indicated by a thick broken line) without involving the fluid suction control.

In the fluid suction control, as has been described above, the electric motor 24 is driven in the depressurizing direction (in the reversing or returning direction) by the amount corresponding to the return amount STB calculated in step S25, whereby the brake fluid is sucked into the hydraulic fluid chamber 26 (from the time 11 to a time T2).

On the other hand, the first cutoff valve 61 and the second cutoff valve 62 are closed at the time T1. This holds the wheel cylinder pressure V1 from the time T1 to the time T2.

When the piston 22 is driven again in the pressurizing direction at the time T2 to thereby increase the stroke amount STR (the total stroke amount), the wheel cylinder pressure V1 starts rising. Then, the wheel cylinder pressure V1 rises to a greatest wheel cylinder pressure V1M in the brake system at a time T3, whereby the pressurizing which exceeds the limit stroke amount STL is complemented.

Since the brake system A of this embodiment includes the fluid suction control, the greatest fluid pressure in the brake system can be enhanced without securing an axial length of the slave cylinder 20 more than required.

Figure 9:
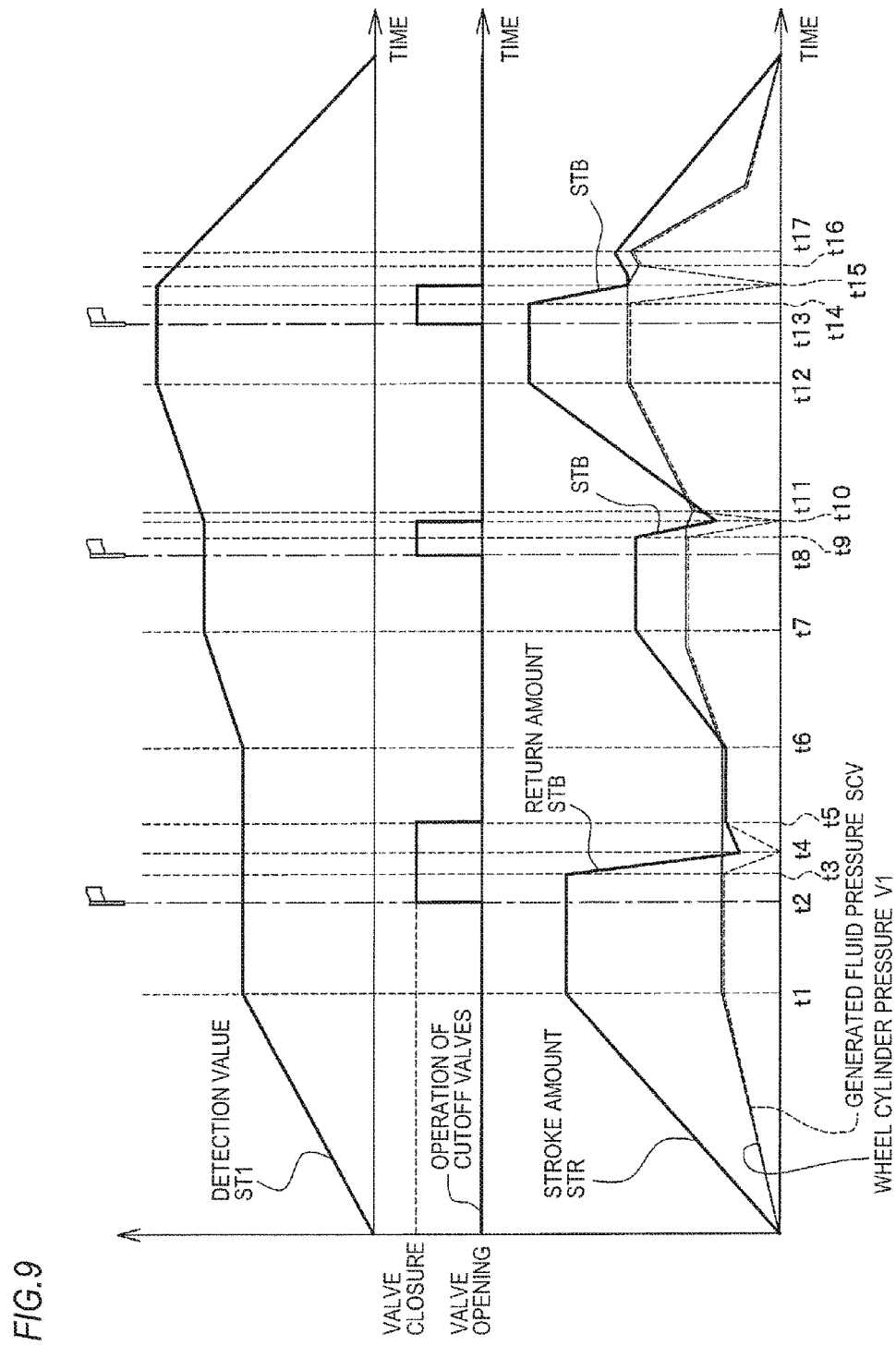
FIG. 9 is a timing chart showing timings at which the fluid suction control is executed when the brakes are applied normally.

Next, referring to FIG. 9, a fluid suction control will be described which is executed at a timing which imposes no effect on the generation of a fluid pressure in the slave cylinder 20. A fluid suction control in FIG. 9 presupposes a normal braking which is free from a situation in which the piston 22 (refer to FIG. 1) does not reach the limit stroke. In the fluid suction control in FIG. 9, the fluid suction control is executed in the event that no change in operation of the brake pedal P occurs after the wheel cylinder pressure V1 has risen to the required fluid pressure required by the driver (in the event of a holding state). However, in the event that a change in operation of the brake pedal P by the driver occurs during the fluid suction control, that is, for example, in the event that the brake pedal P is depressed further or the depression of the brake pedal P is released, the fluid suction control is suspended. Hereinafter, the fluid suction control executed by the electronic control unit 70 will be described in detail.

When the brake pedal P is depressed by the driver, as described before, the electronic control unit 70 calculates a required fluid pressure P3 (not shown) required by the driver based on a detection value ST1 of the stroke sensor ST. Then, the electronic control unit 70 calculates a required stroke amount STW from the map shown in FIG. 7 based on the required fluid pressure P3. Thereafter, the electronic control unit 70 drives the slave cylinder 20 based on the required stroke amount STW, and the piston 22 is driven for pressurization. Then, the wheel cylinder pressure V1 rises as the stroke amount STR increases.

Thereafter, the depression of the brake pedal P is held at a time t1, and when this holding state continues for a predetermined length of time, a fluid suction control is flagged at a time t2 (the electronic control unit 70 determines that a fluid suction control needs to be executed), and the first cutoff valve 61 and the second cutoff valve 62 are closed. This holds the wheel cylinder pressure V1.

Thereafter, the piston 22 is driven in the depressurizing direction for depressurization at a time t3. A reverse stroke amount or return amount STB can be obtained based on, for example, the required stroke amount STW. When the piston 22 is driven in the depressurizing direction for depressurization, a fluid pressure SCV generated in the slave cylinder 20 drops (the time t3→a time t4), and a negative pressure state is produced in the hydraulic fluid chamber 26. This allows the brake fluid to be sucked into the hydraulic fluid chamber 26 by way of the supply line 9a and the common hydraulic fluid line 4 (refer to FIG. 1).

The piston 22 is driven in the pressurizing direction for pressurization at the time t4 so that a generated fluid pressure SCV generated in the slave cylinder 20 becomes the same as the wheel cylinder pressure V1 (the fluid pressures on the downstream sides of the first cutoff valve 61 and the second cutoff valve 62). When the generated fluid pressure SCV generated in the slave cylinder 20 becomes the same as the wheel cylinder pressure V1 at a time t5, the first cutoff valve 61 and the second cutoff valve 62 are opened.

Thereafter, when the driver depresses the brake pedal P again at a time t6, the wheel cylinder pressure V1 rises as the stroke amount STR increases. Then, the depression of the brake pedal P is held at a time t7, and when this holding state continues for a predetermined length of time, a fluid suction control is flagged at a time t8, and the first cutoff valve 61 and the second cutoff valve 62 are closed. This holds the wheel cylinder pressure V1.

Then, the piston 22 is driven in the depressurizing direction for depressurization at a time t9. A reverse stroke amount or return amount STB can be obtained based on, for example, a required stroke amount STW required by a raised stroke amount STR raised from the time t6 to the time t7. When the piston 22 is driven in the depressurizing direction for depressurization, the fluid pressure SCV generated in the slave cylinder 20 drops (the time t9→a time t10), and a negative pressure state is produced in the hydraulic fluid chamber 26. This allows the brake fluid to be sucked into the hydraulic fluid chamber 26 by way of the supply line 9a and the common hydraulic fluid line 4 (refer to FIG. 1).

In this state, when the driver depresses the brake pedal P at the time t10, the fluid suction control is suspended. Then, in association with the suspension of the fluid suction control, the first cutoff valve 61 and the second cutoff valve 62 are opened at the time t10.

The generated fluid pressure SCV of the slave cylinder 20 is raised at a breath by the depression of the brake pedal P, and the generated fluid pressure SCV of the slave cylinder 20 is raised again (a time t11).

Thereafter, the depression of the brake pedal P is held at a time t12, and when this holding state continues for a predetermined length of time, as described before, a fluid suction control is flagged at a time t13, and the first cutoff valve 61 and the second cutoff valve 62 are closed. This holds the wheel cylinder pressure V1.

Then, the piston 22 is driven in the depressurizing direction at a time t14. A reverse stroke amount or return amount STB in this case can be obtained based on, for example, a required stroke amount STW required by a raised stroke amount STR raised from the time t11 to the time t12. When the piston 22 is driven in the depressurizing direction, the generated fluid pressure SCV generated in the slave cylinder 20 drops (the time t14→a time t15) again, and a negative pressure state is produced in the hydraulic fluid chamber 26. This allows the brake fluid to be sucked into the hydraulic fluid chamber 26 by way of the supply line 9a and the common hydraulic fluid line 4 (refer to FIG. 1).

In this state, when the depression of the brake pedal P by the driver is released at the time t15, the fluid suction control is suspended. Then, in association with the suspension of the fluid suction control, the first cutoff valve 61 and the second cutoff valve 62 are opened at the time t15.

The piston 22 is once driven in the pressurizing direction for pressurization at the time t15 so that the generated fluid pressure SCV of the slave cylinder 20 becomes the same as the wheel cylinder pressure V1 (the fluid pressures on the downstream sides of the first cutoff valve 61 and the second cutoff valve 62) (the time t15→a time t17). Thereafter, the piston 22 is driven in the depressurizing direction, and the wheel cylinder pressure V1 drops.

Next, referring to FIG. 10, a fluid suction control will be described which is executed when an anti-lock braking control is executed. When an anti-lock braking control is executed, a control to increase, hold or reduce fluid pressures applied to the wheel brakes is executed frequently, and therefore, the brake fluid that is to be supplied to the wheel brakes needs to be secured. A fluid suction control shown in FIG. 10 is configured so that the fluid suction control is executed when the stroke amount STR of the piston 22 reaches a permitted limit (a limit stroke amount) during an anti-lock braking control. Hereinafter, the fluid suction control by the electronic control unit 70 will be described in detail.

As shown in FIG. 10, when the driver depresses the brake pedal P at a time t21, as described before, the electronic control unit 70 calculates a required fluid pressure 93 (not shown) required by the driver based on a detection value ST1 of the stroke sensor ST. Then, the electronic control unit 70 calculates a required stroke amount STW from the map shown in FIG. 7 based on the required fluid pressure P3. Then, the electronic control unit 70 drives the slave cylinder 20 based on the required stroke amount STW, and the piston 22 is driven in the pressurizing direction for pressurization. Then, the wheel cylinder pressure V1 rises as the stroke amount STR increases.

Thereafter, an anti-lock braking control is executed by the fluid pressure control unit 30 when the wheels are about to lock at a time t22. The anti-lock braking control is realized by selecting appropriately a pressure reducing state where the fluid pressure applied to the wheel cylinders W is reduced, a pressure increasing state where the fluid pressure applied to the wheel cylinders W is increased or a pressure holding state where the fluid pressure applied to the wheel cylinders W is held constant. The electronic control unit 70 determines which to be selected from the pressure reducing state, the pressure increasing state, and the pressure holding state based on information on wheel speeds obtained from wheel speed sensors which are provided near the corresponding wheels.

In the anti-lock braking control, when the pressure reducing state is selected at the time t22, the inlet valves 31 of the fluid pressure control unit 30 shown in FIG. 1 are closed while the outlet valves 32 thereof are opened, whereby the brake fluid acting on the wheel cylinders W is released into the return fluid line 9b through the outlet valves 32. Namely, part of the brake fluid which is supplied to the wheel cylinders W from the slave cylinder 20 is released into the return fluid line 9b. Because of this, for example, in the anti-lock braking control, in the event of the pressure holding state being selected at a time t23 and thereafter, the pressure increasing state being selected at a time t24, in order to secure a fluid pressure required to increase the pressure, the stroke amount STR of the piston 22 is increased.

Thereafter, when the stroke amount STR reaches the permitted limit at a time t25, a fluid suction control is executed. In the fluid suction control, the first cutoff valve 61 and the second cutoff valve 62 are closed (at the time t25), and the piston 22 is driven in the depressurizing direction (in the returning direction) for depressurization based on a reverse stroke amount or return amount STB which is calculated as described before at a time t26. Then, the hydraulic fluid chamber 26 is depressurized to thereby produce a negative pressure state therein, whereby the brake fluid in the reservoir tank 15 is sucked into the hydraulic fluid chamber 26 from the reservoir tank 15 by way of the supply line 9a and the common hydraulic fluid line 4. This allows a stroke amount STR which exceeds the permitted limit to be secured, whereby a desired generated fluid pressure SCV is secured.

When the suction of the brake fluid is completed, the piston 22 is driven in the pressurizing direction for pressurization so that the generated fluid pressure SCV of the slave cylinder 20 becomes the same as the wheel cylinder pressure V1 (the fluid pressures on the downstream sides of the first cutoff valve 61 and the second cutoff valve 62). Thereafter, the first cutoff valve 61 and the second cutoff valve 62 are controlled to be opened (at a time t27), and the fluid suction control ends (at a time t28). In the anti-lock braking control which is to be executed from then on, in the event that the stroke amount SIR reaches the permitted limit again, the fluid suction control is executed in the same way as the way described above, whereby the stroke amount STR which exceeds the permitted limit is secured.

Thus, while the fluid suction control has been described which is executed in the event of the stroke amount SIR reaching the permitted limit, the invention is not limited thereto. Hence, the fluid suction control may be executed at a timing at which the pressure holding control or the pressure reducing control is selected in the anti-lock braking control. As this occurs, the fluid suction control is executed at the other timings than the timing at which the pressure increasing control is executed, and therefore, the brake fluid can be secured effectively at the time of the anti-lock braking control.

A configuration may be adopted in which a road surface friction coefficient estimation module for estimating a road surface friction coefficient is provided in the electronic control unit 70 and the timing at which the fluid suction control is executed is changed based on a road surface friction coefficient which is estimated by this road surface friction coefficient estimation module. As this occurs, for example, in the event that the anti-lock braking control (the pressure reducing control, the pressure holding control) is estimated to continue for a relatively long length of time on a low a road whose road surface friction coefficient is low, the fluid suction control is executed at a predetermined timing which is earlier than the timing at which the stroke amount STR reaches the permitted limit, thereby making it possible to secure the brake fluid effectively. A timing at which the pressure holding control is selected or at a timing at which the pressure reducing control is selected after a predetermined stroke may be used as the predetermined timing.

Additionally, as to the estimation of a road surface friction coefficient, a road surface coefficient can be estimated based on, for example, the fluid pressures at the wheel brakes at a point in time when the pressure is reduced during the anti-lock braking control or the restoration tendencies of the wheels (the wheel accelerations) while the pressure is being reduced.

According to the brake system of the embodiment that has been described heretofore, the connection of the master cylinder 10 with the wheel brakes and the connection of the slave cylinder 20 with the wheel brakes can be switched by the first switching valve 51 and the second switching valve 52. Additionally, the communications from the slave cylinder 20 can be cut off by the first cutoff valve 61 and the second cutoff valve 62. Thus, the fluid pressure applied to the wheel brakes can be changed into the various states without involving a complex configuration, enabling the efficient fluid pressure control which can preferably cope with the conditions of the brake system and the conditions of the vehicle. In addition, the efficient fluid pressure control is enabled without involving a complex configuration, and therefore, it is possible to restrict the brake system from being enlarged in size.

Additionally, not only can the fluid pressures of the two brake systems K1, K2 be raised separately, but also the fluid pressure applied to the two brake systems K1, K2 from the slave cylinder 20 can be cut off separately. Therefore, the efficient fluid pressure control can be enabled.

The fluid pressures in the first communication line 5a and the second communication line 5b can be raised by the single hydraulic fluid chamber 26 which is provided in the slave cylinder 20, whereby the efficient fluid pressure control employing the single hydraulic fluid chamber 26 can be enabled. In addition, the brake system can be restricted from being enlarged in size.

The pressure sensor 7 is provided, whereby the generated fluid pressure of the slave cylinder 20 can be detected by the single pressure sensor 7. Consequently, the configuration of the brake system can be simplified, and the efficient fluid pressure detection can be enabled.

The brake fluid in the reservoir tank 15 can be supplied efficiently into the slave cylinder 20 (the hydraulic fluid chamber 26) through the supply line 9a when the pressurizing operation of the slave cylinder 20 is released.

The check valve 9d is provided on the branch supply line 9c, and therefore, the fluid pressure generated in the slave cylinder 20 can be prevented preferably from being transmitted towards the reservoir tank 15 by the check valve 9d being provided.

No supply port needs to be provided on the slave cylinder 20 because the supply line 9a is connected to the common hydraulic fluid line 4, and this simplifies the configuration of the brake system. In this case, a fluid pressure generated in the slave cylinder 20 can preferably be prevented from being transmitted to the reservoir tank 15 by the check valve 9d. The supply line 9a may be connected directly to the first communication line 5a and the second communication line 5b. The supply line 9a may be connected to the port 19 of the master cylinder 10.

The first cutoff valve 61 and the second cutoff valve 62 are the normally open solenoid valves, and hence, the first cutoff valve 61 and the second cutoff valve 62 do not have to be energized when the normal braking is executed in which the fluid pressures are generated at the wheel brakes by the slave cylinder 20. Consequently, the consumed electric power can be suppressed to the minimum level.

The first cutoff valve 61 and the second cutoff valve 62 can be closed smoothly without any resistance involved when the slave cylinder 20 is activated to operate the pressurizing operation because the valve bodies 61a of the first cutoff valve 61 and the second cutoff valve 62 are pressed against the corresponding valve seats 61c from the slave cylinder 20 side.

The return fluid line 9b is provided which establishes the communication from the outlet valves 32 to the reservoir tank 15, and therefore, the brake fluid can preferably be returned to the reservoir tank 15 without passing through a reservoir for reserving the brake fluid temporarily when the wheel cylinders W are depressurized to reduce the fluid pressure thereat. This can realize the smooth passage of the brake fluid.

The return fluid line 9b is connected directly to the reservoir tank 15 via the second supply port 15c, and therefore, the brake fluid can be returned directly to the reservoir tank 15 without passing through other constituent elements. Thus, the smoother passage of the brake fluid can be realized.

The master cylinder 10, the slave cylinder 20 and the fluid pressure control unit 30 can be mounted on the vehicle as the integral unit, and this can restrict the brake system from being enlarged in size and complex in architecture.

When the electronic control unit 70 determines that the fluid pressure raised by the slave cylinder 20 is lower than the predetermined fluid pressure corresponding to the stroke amount STR of the piston 22 of the slave cylinder 20 in either of the first brake system K1 and the second brake system K2, the cutoff valve in the brake system where the determined phenomenon is occurring while the cutoff valve in the other brake system is opened.

Therefore, even in the event that an abnormal situation where the brake fluid is reduced occurs in one of the two brake systems K1, K2, the pressure raising performance of the other brake system can preferably be secured by driving the slave cylinder 20. Consequently, the fluid pressure control for the other brake system can preferably continue.

Abnormality can be determined based on the detection value obtained when the slave cylinder 20 is driven with one of the first cutoff valve 61 and the second cutoff valve 62 closed and the detection value obtained when the slave cylinder 20 is driven with the other of the first cutoff valve 61 and the second cutoff valve 62 closed. Thus, the occurrence of abnormality in fluid pressure in the two brake systems can be detected efficiently by the single pressure sensor 7. In addition, abnormality can be determined by the single pressure sensor 7, and therefore, the configuration of the brake system can be simplified, whereby the reduction in production costs and in size of the brake system can be realized.

Further, in this embodiment, initially, abnormality is determined based on the detection value obtained when the slave cylinder 20 is driven with both the first cutoff valve 61 and the second cutoff valve 62 closed. Thereafter, abnormality can be determined based on the detection value obtained when the slave cylinder 20 is driven with one of the first cutoff valve 61 and the second cutoff valve 62 closed and the detection value obtained when the slave cylinder 20 is driven with the other of the first cutoff valve 61 and the second cutoff valve 62 closed. Consequently, the occurrence of abnormality in relation to the fluid pressure can be determined by closing the cutoff valves sequentially after whether or not the abnormality exists in the slave cylinder 20 is determined, and therefore, the occurrence of abnormality in the slave cylinder 20 and the occurrence of abnormality in fluid pressure in both the brake systems can be detected efficiently by the single pressure sensor 7.

In addition, in the event that the determination is carried out in a reverse order to the order employed above, whether or not abnormality is occurring in the slave cylinder 20 can be determined after the occurrence of abnormality in fluid pressure is initially determined by closing the cutoff valves sequentially. Thus, in this case, the occurrence of abnormality in fluid pressure in both the brake systems and the occurrence of abnormality in the slave cylinder 20 can be detected efficiently by the single pressure sensor 7.

In the event that the detection value obtained when the slave cylinder 20 is driven with both the first cutoff valve 61 and the second cutoff valve 62 closed is lower than the predetermined fluid pressure which corresponds to the stroke amount STR of the piston 22 of the slave cylinder 20, the first switching valve 51 and the second switching valve 52 are individually switched so that the wheel cylinders W communicate with the master cylinder 10 and are cut off from the slave cylinder 20. Thus, the fluid pressures at the wheel cylinders W can preferably be raised by the fluid pressure from the master cylinder 10 when abnormality is occurring. Consequently, the brake system A can be obtained which functions preferably as a fail-safe.

Further, the first cutoff valve 61 and the second cutoff valve 62 are closed through the fluid suction control, and the piston 22 is driven in the depressurizing direction, whereby the brake fluid is sucked in from the supply line 9a by means of the negative pressure or vacuum. Consequently, even in case the axial length of the slave cylinder 20 is designed relatively short, the brake fluid can be secured in the hydraulic fluid chamber 26 through the fluid suction control. By adopting this configuration, the brake system A can be obtained which can preferably raise the fluid pressure to the high fluid pressure area while avoiding a risk of the slave cylinder 20 being enlarged in size.

In addition, even in the event that the pressure increasing control to increase the fluid pressure, the pressure holding control to hold the fluid pressure and the pressure reducing control to reduce the fluid pressure applied to the wheel cylinders W are executed frequently in the anti-lock braking control, the brake fluid to be supplied to the wheel cylinders W can preferably be secured through the fluid suction control.

The fluid suction control is executed when the stroke amount STR of the piston 22 of the slave cylinder 20 becomes equal to or greater than the predetermined amount (at the timing at which the stroke amount STR becomes the normal greatest stroke amount (the limit stroke amount) STL), and therefore, the fluid suction control is executed only when the high fluid pressure is necessary. Consequently, the brake system A can be obtained which can preferably raise the fluid pressure to the high fluid pressure area while avoiding the risk of the slave cylinder 20 being enlarged in size.

The stroke amount STR of the piston 22 of the slave cylinder 20 is specified based on a rotation angle sensor for detecting a rotation angle of the electric motor 24, and therefore, the stroke amount can be specified accurately based on the rotation angle of the electric motor 24, thereby making it possible to easily specify the timing at which the fluid suction control is executed.

The fluid suction control may be configured so that the necessity of execution of the fluid suction control is determined when the raising amount of the required fluid pressure required by the driver becomes equal to or smaller than a predetermined amount. By adopting this configuration, the fluid suction control can preferably be executed at a timing which imposes no effect on the braking feeling.

The fluid suction control may be configured so that the necessity of execution of the fluid suction control is determined when the absolute value of the required fluid pressure required by the driver becomes equal to or greater than a predetermined value. By adopting this configuration, the fluid pressure can be raised well in, for example, a brake assist control which involves a greater fluid pressure rise than a rise at the time of normal braking.

Further, the fluid suction control may be configured so that the fluid suction control is executed when the wheels (the wheel brakes) are controlled through the pressure holding control or the pressure reducing control. By adopting this configuration, the brake fluid can be secured effectively in the anti-lock braking control by sucking in the brake fluid at the other times than the time of the pressure increasing control in the wheel control situation.

The fluid suction control may be configured so that the fluid suction control is executed when the relationship between the fluid pressure which is raised by the slave cylinder 20 and the stroke amount STR of the piston 22 of the slave cylinder 20 does not meet the predetermined relationship. By adopting this configuration, the brake fluid can be supplied into the slave cylinder 20 through the fluid suction control, whereby the fluid pressure raised by the slave cylinder 20 can be the predetermined fluid pressure which corresponds to the stroke amount STR of the piston 22 of the slave cylinder 20.

The invention claimed is:

1. A brake system comprising a first brake system which communicates with at least one wheel brake of a plurality of wheel brakes and a second brake system which communicates with other wheel brakes, the brake system comprising:
    a master cylinder for generating a master cylinder fluid pressure to be applied to the wheel brakes through operation of a brake operator by a driver;
    a slave cylinder for generating a slave cylinder fluid pressure by employing an electric actuator which is driven based on a traveling amount of the brake operator;
    a first hydraulic fluid line which is provided on the first brake system and which establishes a communication from the master cylinder to the at least one wheel brake;
    a second hydraulic fluid line which is provided on the second brake system and which establishes a communication from the master cylinder to the other wheel brakes;
    a first communication line which establishes a communication from the slave cylinder to the first hydraulic fluid line;
    a second communication line which establishes a communication from the slave cylinder to the second hydraulic fluid line;
    a first switching valve which is provided in a communicating position between the first hydraulic fluid line and the first communication line to switch between a state where the master cylinder fluid pressure in the master cylinder is given to the at least one wheel brake through the first hydraulic fluid line and a state where the slave cylinder fluid pressure in the slave cylinder is given to the at least one the wheel brake through the first communication line and the first hydraulic fluid line;
    a second switching valve which is provided in a communicating position between the second hydraulic fluid line and the second communication line to switch between a state where the master cylinder fluid pressure in the master cylinder is given the other wheel brakes through the second hydraulic fluid line and a state where the slave cylinder fluid pressure in the slave cylinder is given to the other wheel brakes through the second communication line and the second hydraulic fluid line;
    a first cutoff valve which is provided on the first communication line to completely cut off the first communication line;
    a second cutoff valve which is provided on the second communication line to completely cut off the second communication line; and
    control valve modules which are provided individually downstream of the first switching valve in the first hydraulic fluid line and downstream of the second switching valve in the second hydraulic fluid line to control a fluid pressure to be applied to each wheel brake.

2. The brake system according to claim 1, wherein
    the first switching valve and the second switching valve are a three-way valve which switch between a state where when not energized, the three-way valve establishes a communication between the master cylinder and the wheel brakes and cuts off a communication between the slave cylinder and the wheel brakes and a state where when energized, the three-way valve cuts off a communication between the master cylinder and the wheel brakes and establishes a communication between the slave cylinder and the wheel brakes.

3. The brake system according to claim 1, wherein
the slave cylinder comprises one hydraulic fluid chamber, and wherein
the hydraulic fluid chamber communicates with the first communication line and the second communication line by way of a common hydraulic fluid line.

4. The brake system according to claim 3, comprising:
a pressure sensor for measuring a fluid pressure in the common hydraulic fluid line.

5. The brake system according to claim 1, comprising:
a reservoir tank for reserving brake fluid;
a supply line for supplying the brake fluid from the reservoir tank to the slave cylinder; and
a check valve which is provided on the supply line, wherein
the check valve permits only a flow of brake fluid from the reservoir tank to the slave cylinder.

6. The brake system according to claim 5, wherein
the supply line is connected to the first communication line, the second communication line or the common hydraulic fluid line.

7. The brake system according to claim 5, comprising:
a return fluid line which establishes a communication from an outlet valve provided on each of the control valve modules to the reservoir tank.

8. The brake system according to claim 7, wherein
the reservoir tank comprises a first supply port which supplies the brake fluid to the master cylinder and a second supply port which is independent of the first supply port, and wherein
the return fluid line is connected to the second supply port.

9. The brake system according to claim 1, wherein
the first cutoff valve and the second cutoff valve are a normally open solenoid valve, and wherein
valve bodies of the first cutoff valve and the second cutoff valve are pressed against valve seats from the slave cylinder side.

10. The brake system according to claim 1, wherein
the master cylinder, the slave cylinder and the control valve modules are configured as an integral unit.

11. The brake system according to claim 1, comprising:
a control unit for controlling the driving of the electric actuator and controlling the operation of the switching valves and the cutoff valves, wherein
the master cylinder comprising two pistons and being configured so as to output the master cylinder fluid pressure generated in the master cylinder to each of the first brake system and the second brake system,
the slave cylinder comprising one hydraulic fluid chamber and being configured to output the slave cylinder fluid pressure generated in the slave cylinder to each of the first brake system and the second brake system, and
in the event that abnormality in fluid pressure occurs in either the first brake system or the second brake system, the control unit closes the first cutoff valve or the second cutoff valve of the brake system where the abnormality in fluid pressure is occurring and opens the first cutoff valve or the second cutoff valve of the brake system where the fluid pressure is normal.

12. The brake system according to claim 11, comprising:
a determination unit for determining on an occurrence of abnormality in the first brake system and the second brake system, wherein
the determination unit determines on an occurrence of abnormality based on a relationship between the slave cylinder fluid pressure which is raised by the slave cylinder and a stroke amount of the slave cylinder, and wherein
the determination unit determines that abnormality is occurring in the event that the slave cylinder fluid pressure which is raised by the slave cylinder is lower than a predetermined fluid pressure which corresponds to the stroke amount of the slave cylinder.

13. The brake system according to claim 12, wherein
the control unit closes the first cutoff valve and opens the second cutoff valve in the event that the slave cylinder fluid pressure in the first brake system which is raised by the slave cylinder is determined by the determination unit to be lower than the predetermined fluid pressure which corresponds to the stroke amount of the slave cylinder and closes the second cutoff valve and opens the first cutoff valve in the event that the slave cylinder fluid pressure in the second brake system which is raised by the slave cylinder is determined to be lower than the predetermined by the determination unit fluid pressure which corresponds to the stroke amount of the slave cylinder.

14. The brake system according to claim 12, wherein
the slave cylinder communicates with the first communication line and the second communication line by way of a common hydraulic fluid line which is connected to the hydraulic fluid chamber, wherein
a pressure sensor for measuring the slave cylinder fluid pressure in the common hydraulic fluid line is provided, and wherein
the determination unit determines based on a detection value of the pressure sensor whether or not the slave cylinder fluid pressure which is raised by the slave cylinder is lower than the predetermined fluid pressure which corresponds to the stroke amount of the slave cylinder.

15. The brake system according to claim 14, wherein
the determination unit determines based on a detection value of the pressure sensor obtained when the slave cylinder is driven with one of the first cutoff valve and the second cutoff valve closed and a detection value of the pressure sensor obtained when the slave cylinder is driven with the other of the first cutoff valve and the second cutoff valve closed whether or not the fluid pressure which is raised by the slave cylinder is lower than the predetermined fluid pressure which corresponds to the stroke amount of the slave cylinder.

16. The brake system according to claim 14, wherein
the determination unit determines based on a detection value of the pressure sensor obtained when the slave cylinder is driven with both the first cutoff valve and the second cutoff valve closed whether or not the fluid pressure which is raised by the slave cylinder is lower than the predetermined fluid pressure which corresponds to the stroke amount of the slave cylinder.

17. The brake system according to claim 1, wherein
a wheel cylinder pressure of the at least one wheel brake raises to a wheel cylinder pressure V1 when the first cutoff valve is opened, and wherein
a wheel cylinder pressure of the other wheel brakes raises to the wheel cylinder pressure V1 when the second cutoff valve is opened.

18. The brake system according to claim 17, wherein
the wheel cylinder pressure V1 is held when the first cutoff valve and the second cutoff valve are closed.

19. The brake system according to claim 1, wherein
a hydraulic fluid chamber of the slave cylinder communicates with the first hydraulic fluid line by way of a common hydraulic fluid line and the first communication line and communicates with the second hydraulic fluid line by way of the common hydraulic fluid line and the second communication line, wherein
a supply line is connected between a reservoir tank and the slave cylinder, and to the common hydraulic fluid line by way of a branch supply line, and wherein
a check valve is provided on the branch supply line, which permits only a flow of brake fluid from the reservoir tank to the common hydraulic fluid line.

20. The brake system according to claim 1, wherein the first and/or second switching valve move between the states by causing a valve body of the first and/or second switching valve to move to a position to stop flow from the master cylinder via a first connection and to permit flow from the slave cylinder via a second connection towards the wheel brakes.

\* \* \* \* \*